(12) United States Patent
Nakanishi et al.

(10) Patent No.: US 11,124,046 B2
(45) Date of Patent: Sep. 21, 2021

(54) SYSTEM FOR ADJUSTING SECURED COMPUTER RESOURCES TO HANDLE DATA TRANSMISSION FROM APPLIANCES MOUNTED IN A VEHICLE

(71) Applicant: MITSUBISHI ELECTRIC CORPORATION, Tokyo (JP)

(72) Inventors: Sunao Nakanishi, Tokyo (JP); Satoshi Kaede, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 96 days.

(21) Appl. No.: 16/603,047

(22) PCT Filed: May 24, 2017

(86) PCT No.: PCT/JP2017/019371
§ 371 (c)(1),
(2) Date: Oct. 4, 2019

(87) PCT Pub. No.: WO2018/216139
PCT Pub. Date: Nov. 29, 2018

(65) Prior Publication Data
US 2020/0189354 A1 Jun. 18, 2020

(51) Int. Cl.
*G06F 9/50* (2006.01)
*B60H 1/00* (2006.01)
(Continued)

(52) U.S. Cl.
CPC ..... *B60H 1/00771* (2013.01); *B60H 1/00371* (2013.01); *G06F 9/505* (2013.01);
(Continued)

(58) Field of Classification Search
CPC ............ B60H 1/00371; B60H 1/00771; B60Y 2200/30; G06F 9/505; G06F 9/5027;
(Continued)

(56) References Cited

U.S. PATENT DOCUMENTS

2002/0083169 A1 6/2002 Aki et al.
2003/0069972 A1 4/2003 Yoshimura et al.
(Continued)

FOREIGN PATENT DOCUMENTS

EP 2 290 979 A1 3/2011
JP 2002-252614 A 9/2002
(Continued)

OTHER PUBLICATIONS

International Search Report for PCT/JP2017/019371 dated Aug. 1, 2017.
(Continued)

*Primary Examiner* — Le H Luu
(74) *Attorney, Agent, or Firm* — Birch, Stewart, Kolasch & Birch, LLP

(57) ABSTRACT

A vehicle monitoring apparatus (300) transmits transmission data obtained from each appliance (200) and the amount of transmission data to a data processing apparatus (500). First, the data processing apparatus calculates the amount of used resources that is the amount of resources used in processing the transmission data, in the amount of resources of computer resources, on the basis of the amount of transmission data. Next, the data processing apparatus increases or decreases, to the amount of used resources, the amount of secured resources that is the amount of resources secured in the amount of resources of the computer resources. Then, the data processing apparatus processes the transmission data by using the amount of secured resources in the amount of resources of the computer resources.

8 Claims, 23 Drawing Sheets

(51) Int. Cl.
*H04L 12/923* (2013.01)
*H04L 29/08* (2006.01)
*G08C 17/00* (2006.01)
*H04L 12/26* (2006.01)
*H04L 12/913* (2013.01)

(52) U.S. Cl.
CPC .............. *G08C 17/00* (2013.01); *H04L 43/04* (2013.01); *H04L 43/0876* (2013.01); *H04L 47/724* (2013.01); *H04L 47/762* (2013.01); *H04L 67/125* (2013.01); *B60Y 2200/30* (2013.01)

(58) Field of Classification Search
CPC ... G06F 11/302; G06F 11/3409; G08C 17/00; H04L 47/762; H04L 67/125; H04L 41/0896; H04L 43/0876; H04L 47/76; H04M 1/72463; H04W 72/042
See application file for complete search history.

(56) References Cited

U.S. PATENT DOCUMENTS

| | | | | |
|---|---|---|---|---|
| 2004/0267897 | A1* | 12/2004 | Hill | G06F 9/505 709/217 |
| 2012/0331152 | A1* | 12/2012 | Tatsubori | G06F 9/5027 709/226 |
| 2013/0007753 | A1 | 1/2013 | Jain | |
| 2013/0254384 | A1* | 9/2013 | Wray | G06F 11/3409 709/224 |
| 2014/0201332 | A1 | 7/2014 | Kataoka et al. | |
| 2014/0313908 | A1* | 10/2014 | da Silva | H04W 72/042 370/252 |
| 2015/0026336 | A1* | 1/2015 | Suchter | H04L 43/0876 709/224 |
| 2015/0120935 | A1 | 4/2015 | Fukasawa et al. | |
| 2015/0160098 | A1 | 6/2015 | Noda et al. | |
| 2015/0281113 | A1 | 10/2015 | Siciliano et al. | |
| 2016/0344874 | A1* | 11/2016 | Fadell | H04M 1/72463 |
| 2017/0006500 | A1 | 1/2017 | Elias et al. | |
| 2017/0214632 | A1* | 7/2017 | Ravi | H04L 41/0896 |
| 2017/0310605 | A1* | 10/2017 | Garcia | H04L 47/76 |
| 2018/0060127 | A1* | 3/2018 | Esterkin | G06F 11/302 |
| 2018/0191619 | A1* | 7/2018 | Karthikeyan | H04L 47/76 |

FOREIGN PATENT DOCUMENTS

| | | |
|---|---|---|
| JP | 2002-268920 A | 9/2002 |
| JP | 2003-124976 A | 4/2003 |
| JP | 2014-137709 A | 7/2014 |
| JP | 2015-87935 A | 5/2015 |
| JP | 2015-88079 A | 5/2015 |
| JP | 2015-88154 A | 5/2015 |
| JP | 2015-109609 A | 6/2015 |
| JP | 2016-185730 A | 10/2016 |

OTHER PUBLICATIONS

Extended European Search Report dated Oct. 22, 2020 issued in corresponding European Application No. 17 911 177.8.
Nardelli Matteo et al. "Osmotic Flow: Osmotic Computing + IoT Workflow", IEEE Cloud Computing, vol. 4, No. 2, Apr. 26, 2017.
Partial Supplementary European Search Report dated May 19, 2020 issued in corresponding European Application No. 17 911 177.8.
Indian Examination Report dated Jun. 25, 2021 issued in corresponding Indian Application No. 201947044900 with English Translation.
Communication pursuant to Article 94(3) EPC dated Jul. 23, 2021 received in corresponding EP Application No. 17 911 177.8.

* cited by examiner

Fig. 7

| APPLIANCE IDENTIFIER | MEASUREMENT TIME | SET TEMPERATURE | EXHAUST TEMPERATURE | ·· |
|---|---|---|---|---|
| A0001 | 2017/02/01/<br>7:12:30, 0 | 20℃ | 20℃ | ··· |
| A0001 | 2017/02/01<br>7:12:30, 2 | 20℃ | 20℃ | ·· |
| A0001 | 2017/02/01<br>7:12:30, 4 | 21℃ | 20℃ | ··· |
| : | : | : | | |

| APPLIANCE IDENTIFIER | DIAGNOSIS TIME | DIAGNOSIS RESULT | AMOUNT OF OPERATION DATA | |
|---|---|---|---|---|
| A0001 | 2017/02/01 7:12:30, 0 | GOOD | 60KB/min | ←—292 |
| A0001 | 2017/02/01 9:12:30, 0 | SMALL DEGRADATION | 180KB/min | ←—292 |

Fig.10

391: TRANSMISSION DATA

| APPLIANCE IDENTIFIER | MEASUREMENT TIME | SET TEMPERATURE | EXHAUST TEMPERATURE | ... |
|---|---|---|---|---|
| A0001 | 2017/02/01 7:12:30, 0 | 20℃ | 22℃ | ... |
| A0002 | 2017/02/01 7:12:30, 0 | 20℃ | 22℃ | ... |
| A0003 | 2017/02/01 7:12:30, 0 | 21℃ | 23℃ | ... |
| | : | : | : | |

Fig.11

392: LOAD MONITORING DATA

| VEHICLE IDENTIFIER | CALCULATION TIME | AMOUNT OF TRANSMISSION DATA |
|---|---|---|
| B0001 | 2017/02/01 7:12:30, 0 | 1.2MB/min |

Fig.14

491·TRAVEL MANAGEMENT DATA

| VEHICLE IDENTIFIER | TRAIN COMPOSITION IDENTIFIER | STATION NAME | SCHEDULED TIME | DELAY TIME |
|---|---|---|---|---|
| R0001 | B0001 | S1 STATION | 2017/02/01 7:12:30 | 0 |
| R0001 | B0001 | S2 STATION | 2017/02/01 7:16:00 | 10 |

591·VEHICLE MANAGEMENT DATA

| VEHICLE IDENTIFIER | TRAIN COMPOSITION IDENTIFIER | AMOUNT OF TRANSMISSION DATA | START TIME | END TIME |
|---|---|---|---|---|
| R0001 | B0001 | 1MB/min | 2017/02/01 7:12:30 | 2017/02/01 9:22:30 |
| R0002 | B0001 | 10MB/min | 2017/02/01 12 12:30 | 2017/02/01 14.12.30 |

| AMOUNT OF TRANSMISSION DATA | AMOUNT OF USED RESOURCES |
|---|---|
| 6MB/min | 6 INSTANCES |
| 16MB/min | 1 6 INSTANCES |
| 11MB/min | 1 1 INSTANCES |
| 1MB/min | 1 INSTANCES |

SYSTEM FOR ADJUSTING SECURED COMPUTER RESOURCES TO HANDLE DATA TRANSMISSION FROM APPLIANCES MOUNTED IN A VEHICLE

TECHNICAL FIELD

The present invention relates to a technology for performing data processing while adjusting the amount of resources to be used for the data processing in the amount of resources of computer resources.

BACKGROUND ART

In railroad services, railroad operators and vehicle appliance manufacturers aim at condition-based maintenance.

Specifically, a railroad operator and a vehicle appliance manufacturer acquire, accumulate and analyze operation data of an appliance to detect a sign of a failure of the appliance.

Moreover, a corporation aiming at data utilization uses a public cloud as an infrastructure for collecting data. A public cloud enables adjustment of the amount of computer resources.

The amount of operation data changes depending on the state of an appliance mounted in a vehicle.

Accordingly, in the case where the operation data is transmitted from a vehicle to the public cloud, the amount of resources necessary to process the operation data in the public cloud changes over time.

In the case where the public cloud is used, a fee is charged according to the amount of resources that is used.

Accordingly, if a fee is charged according to the amount of resources with which a maximum amount of operation data can be processed, a cost is incurred for an unnecessary amount of resources.

To reduce the cost for an unnecessary amount of resources, a mechanism for efficiently adjusting the amount of resources is necessary.

Patent Literature 1 discloses a technology for adjusting the amount of resources used in the public cloud.

With the technology disclosed in Patent Literature 1, the necessary amount of resources is calculated on the basis of the amount of data notified in advance by an appliance.

CITATION LIST

Patent Literature

Patent Literature 1: JP 2015-87935 A

SUMMARY OF INVENTION

Technical Problem

A railroad operator and a vehicle appliance manufacturer install a sensor in an appliance to be mounted in a vehicle, and monitor the state of the appliance by using the sensor.

Furthermore, efforts are being made by each company so as to enable acquisition of a degradation state from an appliance by causing the appliance to diagnose its own state.

In the case where degradation of the appliance is advancing, a greater number of pieces of operation data is acquired than in a case where degradation of the appliance is not advancing, so as to perform a more detailed analysis of a time when the appliance will fail.

That is, the amount of data that is transmitted to a public cloud changes depending on the degradation state of the appliance.

In a case where the technology disclosed in Patent Literature 1 is applied to a railroad service, a user of the public cloud secures necessary computer resources by notifying of the necessary amount of resources before transmitting operation data to the public cloud.

However, the public cloud cannot secure the necessary computer resources before the operation data is transmitted. Accordingly, because the operation data is transmitted before the computer resources are secured, computer resources necessary to process the operation data may possibly become insufficient.

The present invention has its object to enable data processing to be performed by securing just the necessary amount of resources.

Solution to Problem

A data processing system according to the present invention includes:

a transmission data reception unit to receive transmission data and an amount of transmission data;

a resource amount calculation unit to calculate, on a basis of the amount of transmission data, an amount of used resources that is an amount of resources that is used in processing the transmission data, in an amount of resources of computer resources;

a resource amount adjustment unit to increase or decrease, to the amount of used resources, an amount of secured resources that is an amount of resources that is secured in the amount of resources of the computer resources; and a data processing unit to process the transmission data by using the amount of secured resources in the amount of resources of the computer resources.

Advantageous Effects of Invention

According to the present invention, data processing can be performed by securing just the necessary amount of resources.

BRIEF DESCRIPTION OF DRAWINGS

FIG. 7 is a diagram illustrating measurement data 291 according to the first embodiment.

FIG. 8 is a diagram illustrating diagnosis data 292 according to the first embodiment.

FIG. 10 is a diagram illustrating transmission data 391 according to the first embodiment.

FIG. 11 is a diagram illustrating load monitoring data 392 according to the first embodiment.

FIG. 14 is a diagram illustrating travel management data 491 according to the first embodiment.

DESCRIPTION OF EMBODIMENTS

Figure 1:
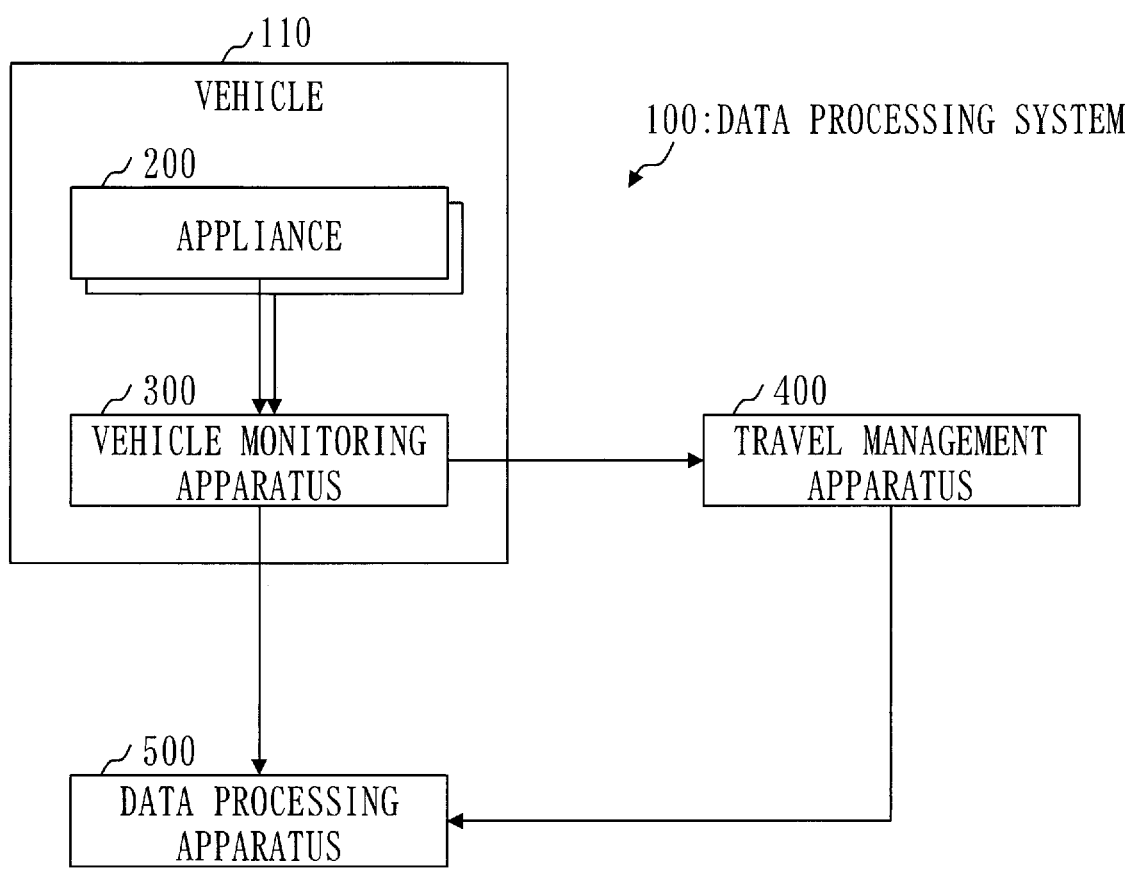
FIG. 1 is a configuration diagram of a data processing system 100 according to a first embodiment.

In embodiments and drawings, same elements or corresponding elements are denoted by same reference signs. A description of an element denoted by a same reference sign is omitted or simplified as appropriate. Arrows in the drawings mainly indicate flows of data or flows of processes.

First Embodiment

A mode of performing data processing by securing just the necessary amount of resources will be described with reference to FIGS. 1 to 18.

*Description of Configuration*

A configuration of a data processing system 100 will be described with reference to FIG. 1.

The data processing system 100 includes one or more appliances 200.

The data processing system 100 further includes a vehicle monitoring apparatus 300, a travel management apparatus 400, and a data processing apparatus 500.

The one or more appliances 200 and the vehicle monitoring apparatus 300 are mounted in a vehicle 110.

Specifically, the vehicle 110 is a railroad vehicle.

For example, the appliance 200 is an air conditioner.

The vehicle monitoring apparatus 300 monitors an operation state of each appliance 200, and a travel state of the vehicle 110.

The travel management apparatus 400 manages a travel schedule of the vehicle 110.

The data processing apparatus 500 processes data that is acquired by each appliance 200.

Figure 2:
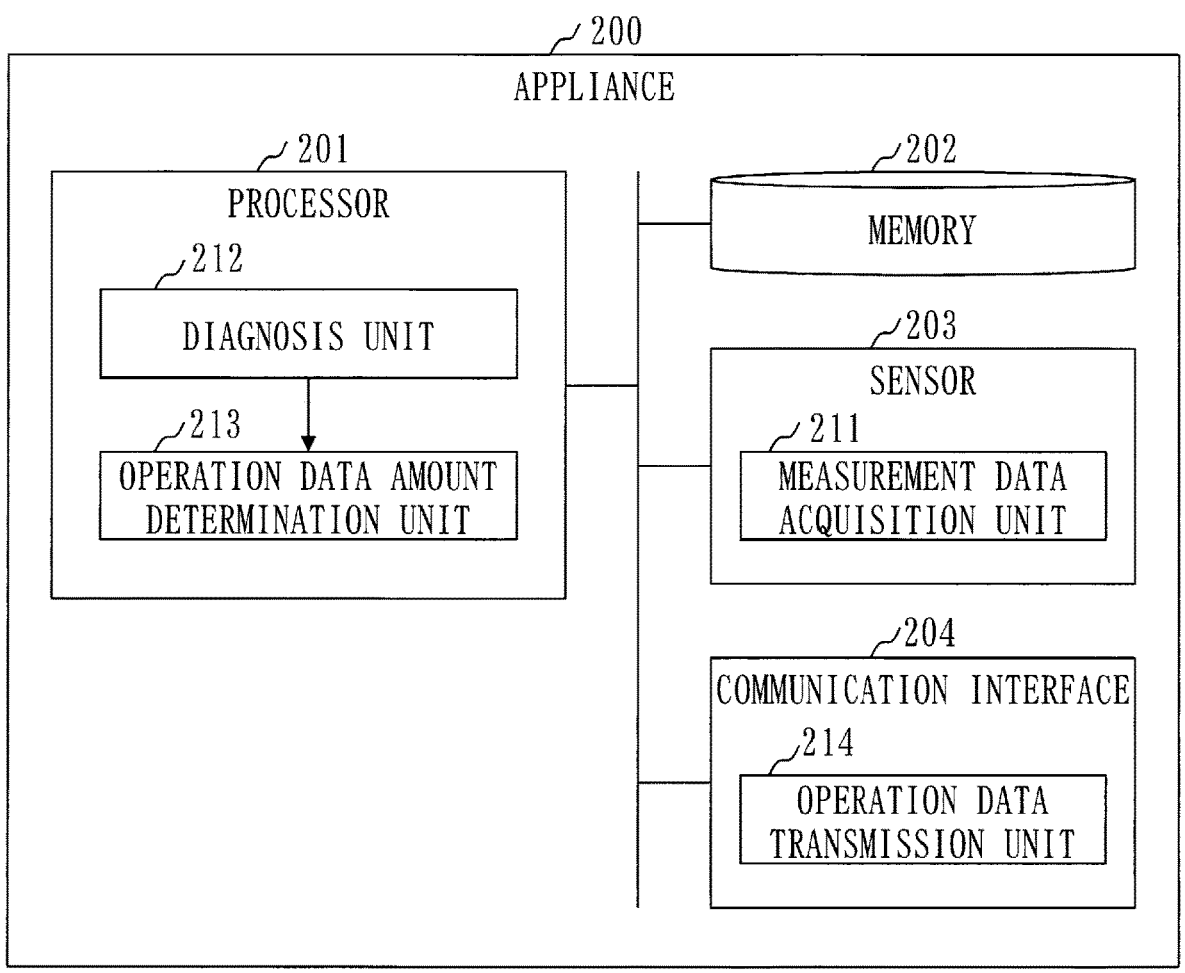
FIG. 2 is a configuration diagram of an appliance 200 according to the first embodiment.

A configuration of the appliance 200 will be described with reference to FIG. 2.

The appliance 200 is a computer including pieces of hardware such as a processor 201, a memory 202, a sensor 203, and a communication interface 204. These pieces of hardware are interconnected by a signal line.

The processor 201 is an integrated circuit (IC) that performs arithmetic processing, and controls other hardware. For example, the processor 201 is a central processing unit (CPU).

The memory 202 is a volatile or non-volatile storage device. The memory 202 is also referred to as a main storage device or a main memory. For example, the memory 202 is a random access memory (RAM).

The sensor 203 is a device that performs measurement. For example, the sensor 203 is a temperature sensor.

The communication interface 204 is an interface to which a communication device is connected. The communication device includes a receiver and a transmitter.

The appliance 200 includes software elements such as a diagnosis unit 212 and an operation data amount determination unit 213. The software elements are elements that are implemented by software.

Appliance programs for causing the computer to function as the diagnosis unit 212 and the operation data amount determination unit 213 are stored in the memory 202. The appliance programs are executed by the processor 201.

An operating system (OS) is further stored in the memory 202. The OS is executed by the processor 201.

That is, the processor 201 executes the appliance program while executing the OS.

Data that is obtained by executing the appliance program is stored in a storage device such as the memory 202, a register in the processor 201, or a cache memory in the processor 201.

The sensor 203 functions as a measurement data acquisition unit 211.

The communication interface 204 functions as an operation data transmission unit 214.

The appliance 200 may include a plurality of processors instead of the processor 201. The plurality of processors share a role of the processor 201.

The appliance program may be recorded in a non-volatile recording medium such as an optical disk or a flash memory in a computer-readable manner.

Figure 3:
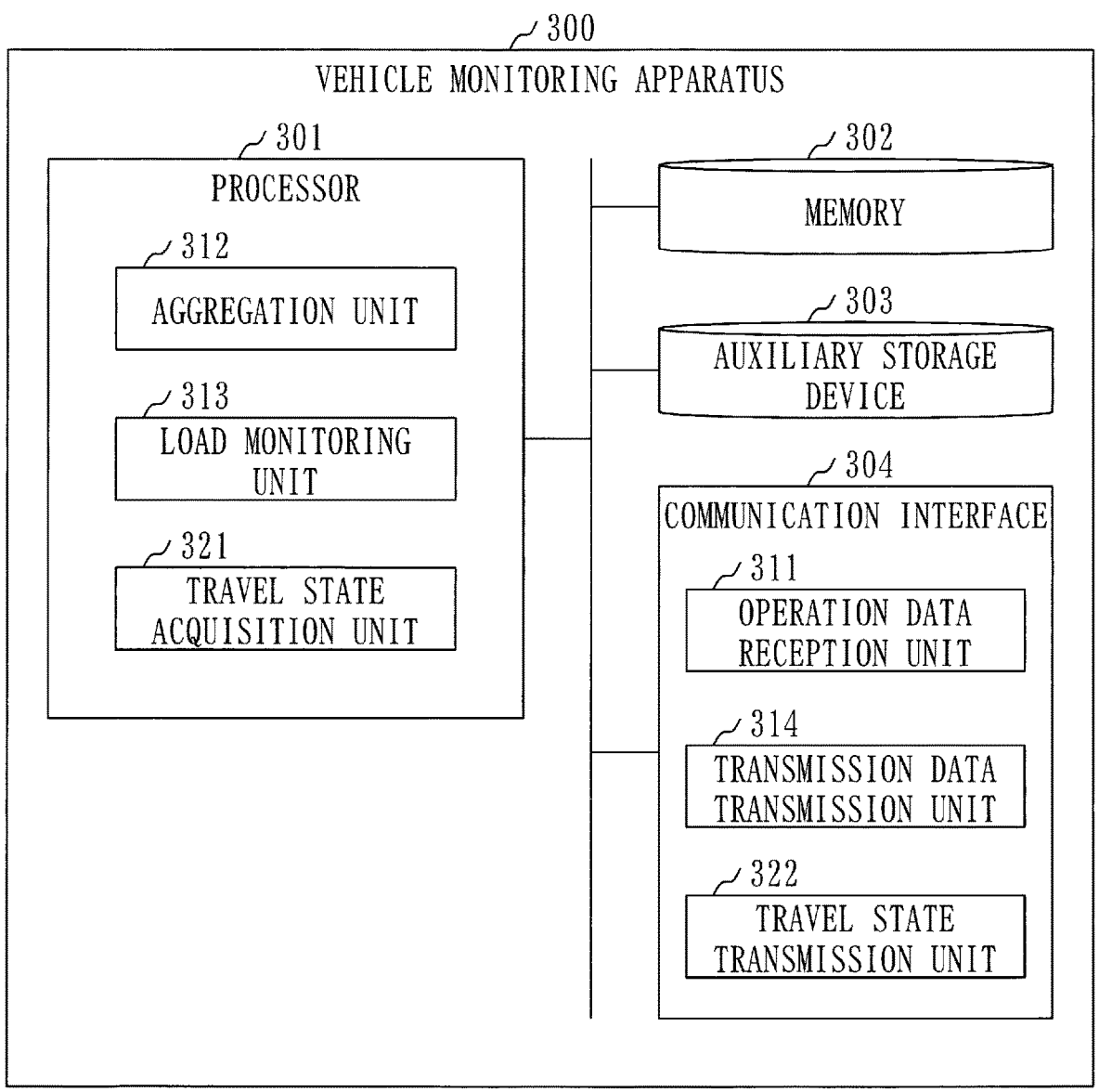
FIG. 3 is a configuration diagram of a vehicle monitoring apparatus 300 according to the first embodiment.

A configuration of the vehicle monitoring apparatus 300 will be described with reference to FIG. 3.

The vehicle monitoring apparatus 300 is a computer including pieces of hardware such as a processor 301, a memory 302, an auxiliary storage device 303, and a communication interface 304. These pieces of hardware are interconnected by a signal line.

The processor 301 is an IC that performs arithmetic processing, and controls other hardware. For example, the processor 301 is a CPU.

The memory 302 is a volatile storage device. The memory 302 is also referred to as a main storage device or a main memory. For example, the memory 302 is a RAM. Data stored in the memory 302 is saved in the auxiliary storage device 303 as necessary.

The auxiliary storage device 303 is a non-volatile storage device. For example, the auxiliary storage device 303 is a read only memory (ROM), a hard disk drive (HDD), or a flash memory. Data stored in the auxiliary storage device 303 is loaded into the memory 302 as necessary.

The communication interface 304 is an interface to which a communication device is connected.

The vehicle monitoring apparatus 300 includes software elements such as an aggregation unit 312, a load monitoring unit 313, and a travel state acquisition unit 321. The software elements are elements that are implemented by software.

Vehicle monitoring programs for causing the computer to function as the aggregation unit 312, the load monitoring unit 313, and the travel state acquisition unit 321 are stored in the auxiliary storage device 303. The vehicle monitoring programs are loaded into the memory 302, and are executed by the processor 301.

An OS is further stored in the auxiliary storage device 303. At least a part of the OS is loaded into the memory 302, and is executed by the processor 301.

That is, the processor 301 executes the vehicle monitoring program while executing the OS.

Data that is obtained by executing the vehicle monitoring program is stored in a storage device such as the memory 302, the auxiliary storage device 303, a register in the processor 301, or a cache memory in the processor 301.

The communication interface 304 functions as an operation data reception unit 311, a transmission data transmission unit 314, and a travel state transmission unit 322.

The vehicle monitoring apparatus 300 may include a plurality of processors instead of the processor 301. The plurality of processors share a role of the processor 301.

The vehicle monitoring program may be recorded in a non-volatile recording medium such as a magnetic disk, an optical disk, or a flash memory in a computer-readable manner.

Figure 4:
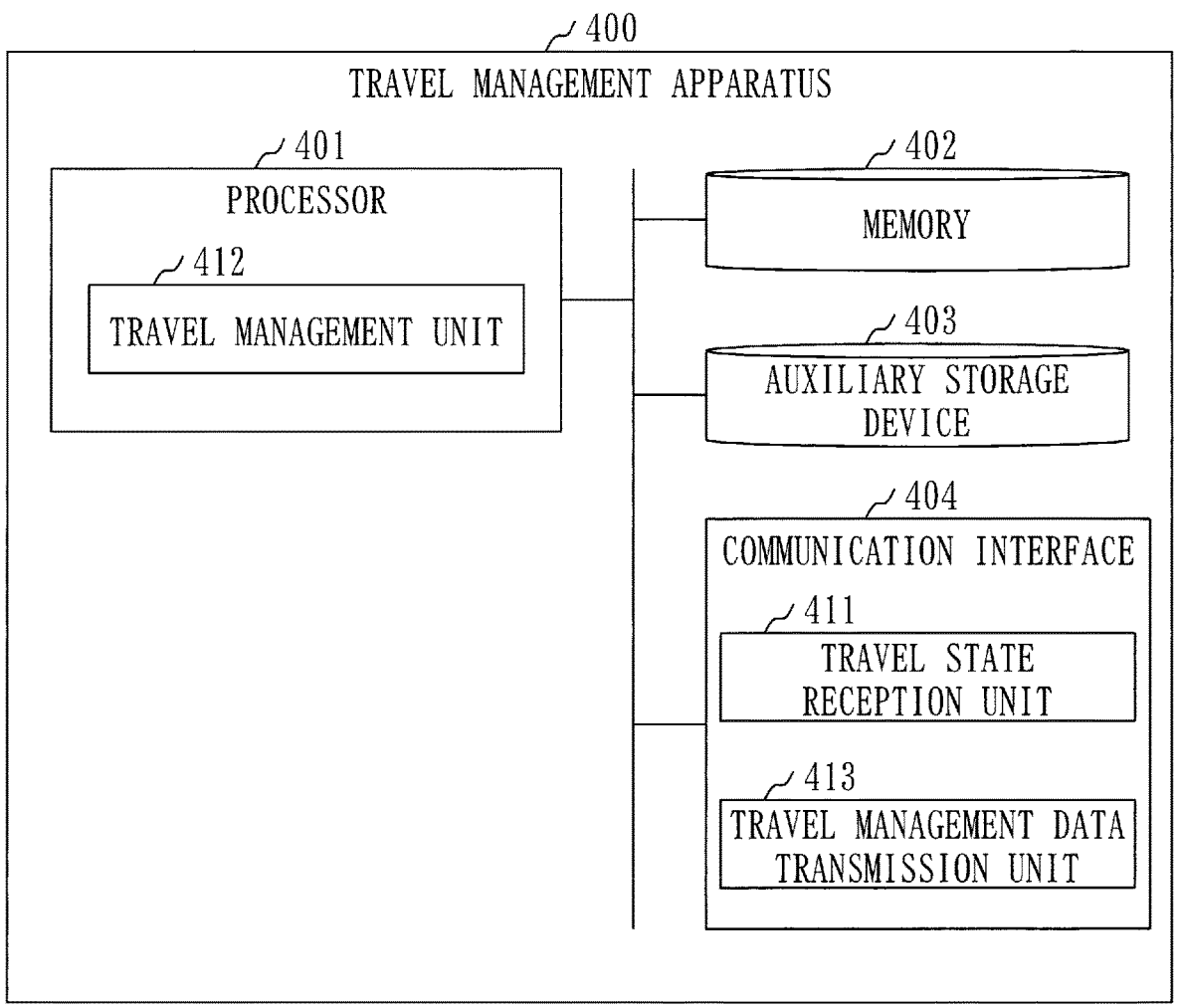
FIG. 4 is a configuration diagram of a travel management apparatus 400 according to the first embodiment.

A configuration of the travel management apparatus 400 will be described with reference to FIG. 4.

The travel management apparatus 400 is a computer including pieces of hardware such as a processor 401, a memory 402, an auxiliary storage device 403, and a communication interface 404. These pieces of hardware are interconnected by a signal line.

The processor 401 is an IC that performs is arithmetic processing, and controls other hardware. For example, the processor 401 is a CPU.

The memory 402 is a volatile storage device. The memory 402 is also referred to as a main storage device or a main memory. For example, the memory 402 is a RAM. Data stored in the memory 402 is saved in the auxiliary storage device 403 as necessary.

The auxiliary storage device 403 is a non-volatile storage device. For example, the auxiliary storage device 403 is a ROM, an HDD, or a flash memory. Data stored in the auxiliary storage device 403 is loaded into the memory 402 as necessary.

The communication interface 404 is an interface to which a communication device is connected.

The travel management apparatus 400 includes software elements such as a travel management unit 412. The software elements are elements that are implemented by software.

A travel management program for causing the computer to function as the travel management unit 412 is stored in the auxiliary storage device 403. The travel management program is loaded into the memory 402, and is executed by the processor 401.

An OS is further stored in the auxiliary storage device 403. At least a part of the OS is loaded into the memory 402, and is executed by the processor 401.

That is, the processor 401 executes the travel management program while executing the OS.

Data that is obtained by executing the travel management program is stored in a storage device such as the memory 402, the auxiliary storage device 403, a register in the processor 401, or a cache memory in the processor 401.

The communication interface 404 functions as a travel state reception unit 411 and a travel management data transmission unit 413.

The travel management apparatus 400 may include a plurality of processors instead of the processor 401. The plurality of processors share a role of the processor 401.

The travel management program may be recorded in a non-volatile recording medium such as a magnetic disk, an optical disk, or a flash memory in a computer-readable manner.

Figure 5:
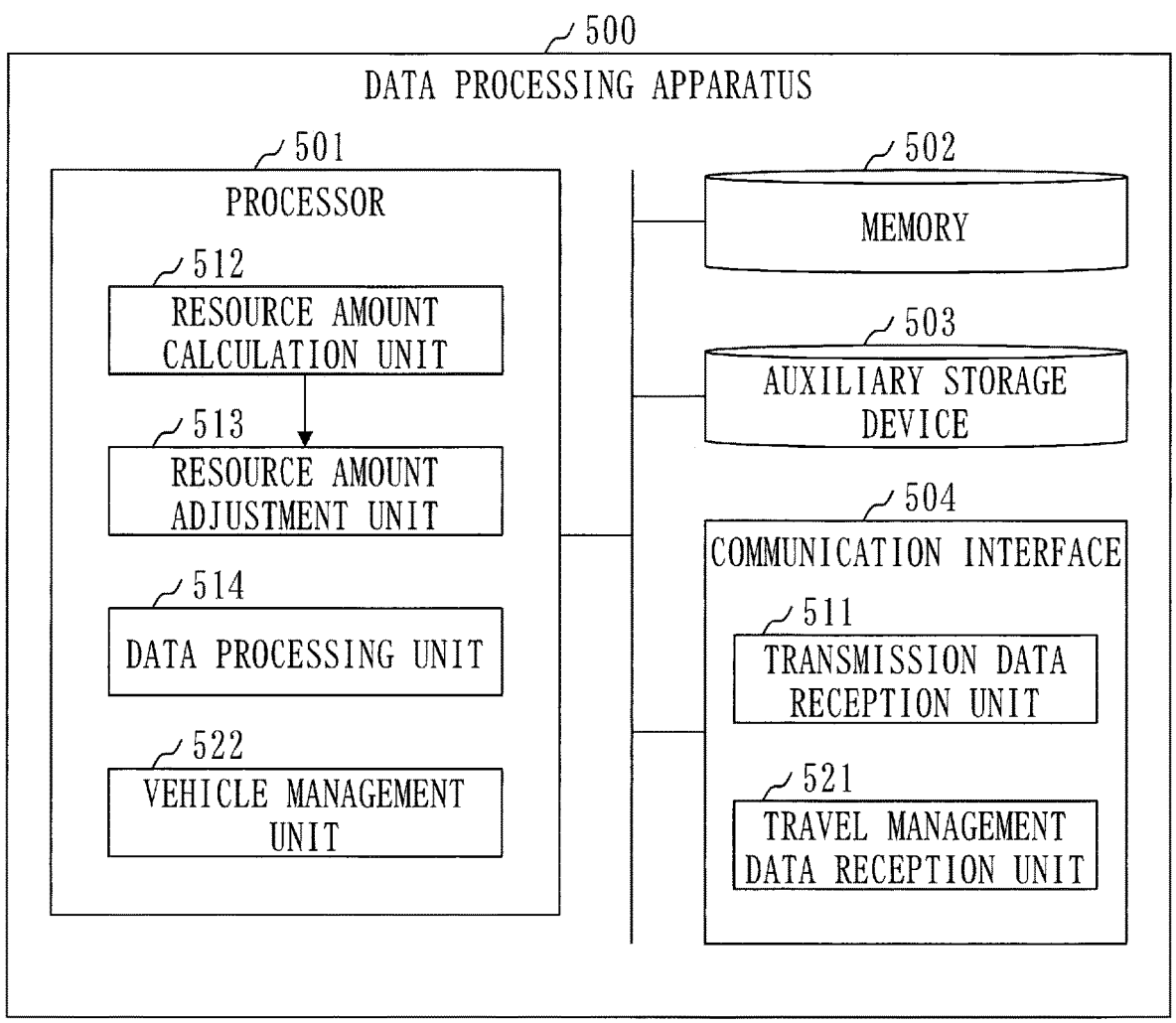
FIG. 5 is a configuration diagram of a data processing apparatus 500 according to the first embodiment.

A configuration of the data processing apparatus 500 will be described with reference to FIG. 5.

The data processing apparatus 500 is a computer including pieces of hardware such as a processor 501, a memory 502, an auxiliary storage device 503, and a communication interface 504. These pieces of hardware are interconnected by a signal line.

The processor 501 is an IC that performs arithmetic processing, and controls other hardware. For example, the processor 501 is a CPU.

The memory 502 is a volatile storage device. The memory 502 is also referred to as a main storage device or a main memory. For example, the memory 502 is a RAM. Data stored in the memory 502 is saved in the auxiliary storage device 503 as necessary.

The auxiliary storage device 503 is a non-volatile storage device. For example, the auxiliary storage device 503 is a ROM, an HDD, or a flash memory. Data stored in the auxiliary storage device 503 is loaded into the memory 502 as necessary.

The communication interface 504 is an interface to which a communication device is connected.

The data processing apparatus 500 includes software elements such as a resource amount calculation unit 512, a resource amount adjustment unit 513, a data processing unit 514, and a vehicle management unit 522. The software elements are elements that are implemented by software.

Data processing programs for causing the computer to function as the resource amount calculation unit 512, the resource amount adjustment unit 513, the data processing unit 514, and the vehicle management unit 522 are stored in the auxiliary storage device 503. The data processing programs are loaded into the memory 502, and are executed by the processor 501.

An OS is further stored in the auxiliary storage device 503. At least a part of the OS is loaded into the memory 502, and is executed by the processor 501.

That is, the processor 501 executes the data processing program while executing the OS.

Data that is obtained by executing the data processing program is stored in a storage device such as the memory 502, the auxiliary storage device 503, a register in the processor 501, or a cache memory in the processor 501.

The communication interface 504 functions as a transmission data reception unit 511 and a travel management data reception unit 521.

The data processing apparatus 500 may include a plurality of processors instead of the processor 501. The plurality of processors share a role of the processor 501.

The data processing program may be recorded in a non-volatile recording medium such as a magnetic disk, an optical disk, or a flash memory in a computer-readable manner.

\*\*\*Description of Operation\*\*\*

An operation of the data processing system 100, particularly an operation of the data processing apparatus 500, corresponds to a data processing method. Furthermore, a procedure of the data processing method by the data processing apparatus 500 corresponds to a procedure of the data processing program.

Figure 6:
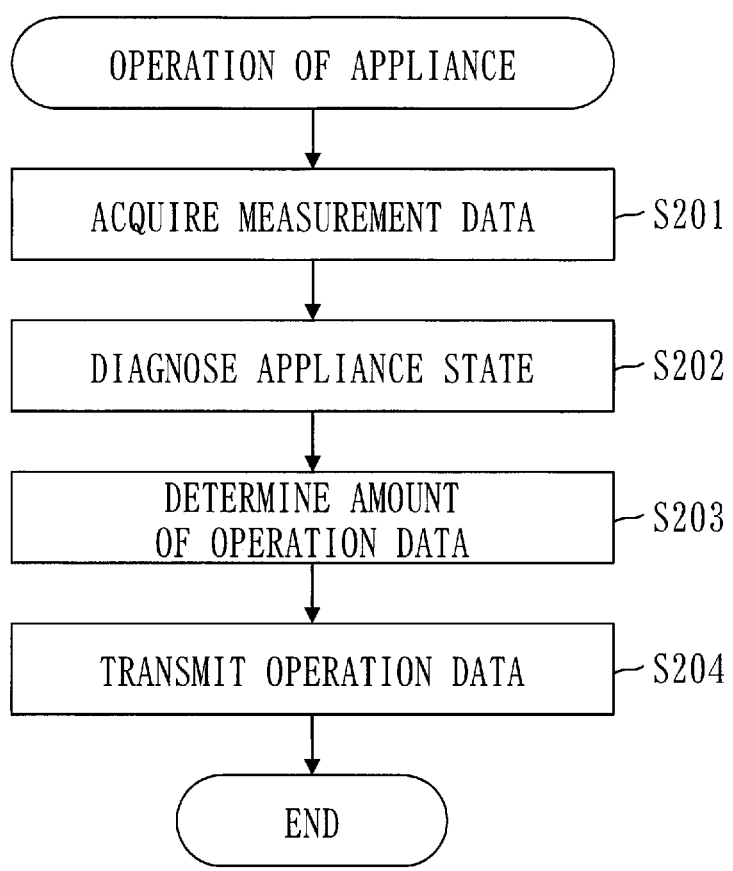
FIG. 6 is a flowchart illustrating an operation of the appliance 200 according to the first embodiment.

An operation of the appliance 200 will be described with reference to FIG. 6.

In step S201, the measurement data acquisition unit 211 acquires measurement data 291 every unit time.

Specifically, every time a unit time passes, the measurement data acquisition unit 211 performs measurement and generates the measurement data 291. The measurement data 291 includes a measurement value. The measurement value is a value that is obtained by measurement. For example, the measurement value is a temperature. For example, the unit time is 100 milliseconds.

The measurement data 291 for a case where the appliance 200 is an air conditioner will be described with reference to FIG. 7.

The measurement data 291 includes an appliance identifier, a measurement time, and a set temperature (set value). The measurement data 291 further includes a measurement value such as an exhaust temperature.

The appliance identifier is an identifier for identifying the appliance 200.

The measurement time is a time when measurement is performed.

Referring back to FIG. 6, a description will be given from step S202.

In step S202, the diagnosis unit 212 diagnoses an appliance state on the basis of the measurement data 291. The appliance state is a state of the appliance 200. Specifically, the appliance state is a state of degradation of the appliance 200.

Specifically, the diagnosis unit 212 performs diagnosis in the following manner. Here, the measurement data 291 is assumed to include the set temperature and the exhaust temperature.

First, the diagnosis unit 212 calculates a difference between the set temperature and the exhaust temperature. The calculated difference will be referred to as a temperature difference.

Then, the diagnosis unit 212 determines the state of degradation of the appliance 200 on the basis of the temperature difference. The greater the temperature difference, the more degraded the appliance 200 is.

For example, the diagnosis unit 212 determines the state of degradation of the appliance 200 in the following manner. Determination standards are determined in advance.

In the case where the temperature difference is less than 1° C., the diagnosis unit 212 determines that the appliance 200 is normal.

In the case where the temperature difference is 1° C. or more and less than 2° C., the diagnosis unit 212 determines that the appliance 200 is somewhat degraded.

In the case where the temperature difference is 2° C. or more, the diagnosis unit 212 determines that the appliance 200 is degraded.

In step S203, the operation data amount determination unit 213 determines the amount of operation data on the basis of the appliance state.

The amount of operation data is a volume of the operation data.

The operation data is measurement data to be transmitted to the vehicle monitoring apparatus 300.

The more degraded the appliance 200 is, the greater the amount of operation data is.

For example, the operation data amount determination unit 213 determines the amount of operation data in the following manner. Determination standards are determined in advance.

In the case where the appliance 200 is normal, the operation data amount determination unit 213 determines the amount of operation data to be 60 kilobytes per minute.

In the case where the appliance 200 is somewhat degraded, the operation data amount determination unit 213 determines the amount of operation data to be 180 kilobytes per minute.

In step S204, the operation data transmission unit 214 transmits, to the vehicle monitoring apparatus 300, measurement data, in the acquired measurement data 291, of the amount of data corresponding to the amount of operation data. The measurement data that is transmitted is operation data.

For example, in the case where the appliance 200 is normal, the operation data transmission unit 214 transmits one piece of measurement data 291 per second to the vehicle monitoring apparatus 300. Furthermore, in the case where the appliance 200 is somewhat degraded, the operation data transmission unit 214 transmits one piece of measurement data 291 per 100 milliseconds.

In the case where the appliance 200 is normal, types of measurement values to be transmitted to the vehicle monitoring apparatus 300 may be increased. For example, power consumption of the appliance 200 may be included in the measurement data 291.

Step S204 will be further described.

The operation data transmission unit 214 transmits the amount of operation data to the vehicle monitoring apparatus 300.

Specifically, the operation data transmission unit 214 transmits the diagnosis data 292 to the vehicle monitoring apparatus 300. The diagnosis data 292 indicates the amount of operation data.

The diagnosis data 292 will be described with reference to FIG. 8.

The diagnosis data 292 includes the appliance identifier, a diagnosis time, a diagnosis result, and the amount of operation data.

The diagnosis time is a time when the state of degradation of the appliance 200 is diagnosed.

The diagnosis result indicates the state of degradation of the appliance 200.

"KB" refers to kilobyte, and "min" refers to minute.

A first operation of the vehicle monitoring apparatus 300 will be described with reference to FIG. 9.

In step S311, the operation data reception unit 311 receives the operation data and the diagnosis data 292 transmitted from each appliance 200.

In step S312, the aggregation unit 312 aggregates the operation data of the appliances 200, and generates transmission data 391. The transmission data 391 is data to be transmitted to the data processing apparatus 500.

Specifically, the aggregation unit 312 creates a table including the operation data of each appliance 200. The created table is the transmission data 391.

The transmission data 391 will be described with reference to FIG. 10.

The transmission data 391 is a data in a table format, and includes a record for each appliance 200.

Each record includes the appliance identifier, the measurement time, and the set temperature. Each record further includes measurement values such as the exhaust temperature.

Referring back to FIG. 9, a description will be given from step S313.

In step S313, the load monitoring unit 313 calculates the amount of transmission data by totaling the amount of operation data of the appliances 200, and. The amount of transmission data is the amount of the transmission data 391.

Specifically, the load monitoring unit 313 acquires the amount of operation data from the diagnosis data 292 for each appliance 200. Then, the load monitoring unit 313 calculates a total of the acquired amounts of operation data. The calculated value is the amount of transmission data.

In step S314, the transmission data transmission unit 314 transmits the transmission data 391 to the data processing apparatus 500.

Furthermore, the transmission data transmission unit 314 transmits the amount of transmission data to the data processing apparatus 500.

Specifically, the transmission data transmission unit 314 transmits the load monitoring data 392 to the data processing apparatus 500. The load monitoring data 392 indicates the amount of transmission data.

The load monitoring data 392 will be described with reference to FIG. 11.

The load monitoring data 392 includes a vehicle identifier, a calculation time, and the amount of transmission data.

The vehicle identifier is an identifier for identifying the vehicle monitoring apparatus 300.

The calculation time is a time when the amount of transmission data is calculated.

A second operation of the vehicle monitoring apparatus 300 will be described with reference to FIG. 12.

In step S321, the travel state acquisition unit 321 acquires travel state data.

The travel state data is data indicating a vehicle identifier and a travel state.

The vehicle identifier is an identifier for identifying the vehicle 110.

The travel state is information indicating an arrival station and an arrival time. The arrival station is a station of arrival of the vehicle 110. The arrival time is a time of arrival of the vehicle 110 at the station. For example, the operation state indicates that the vehicle 110 arrived at S station at 09:12:30.

For example, the vehicle 110 includes a travel monitoring apparatus for monitoring the travel state. Then, the travel state acquisition unit 321 acquires the travel state data from the travel monitoring apparatus.

In step S322, the travel state transmission unit 322 transmits the travel state data to the travel management apparatus 400.

Figure 13:
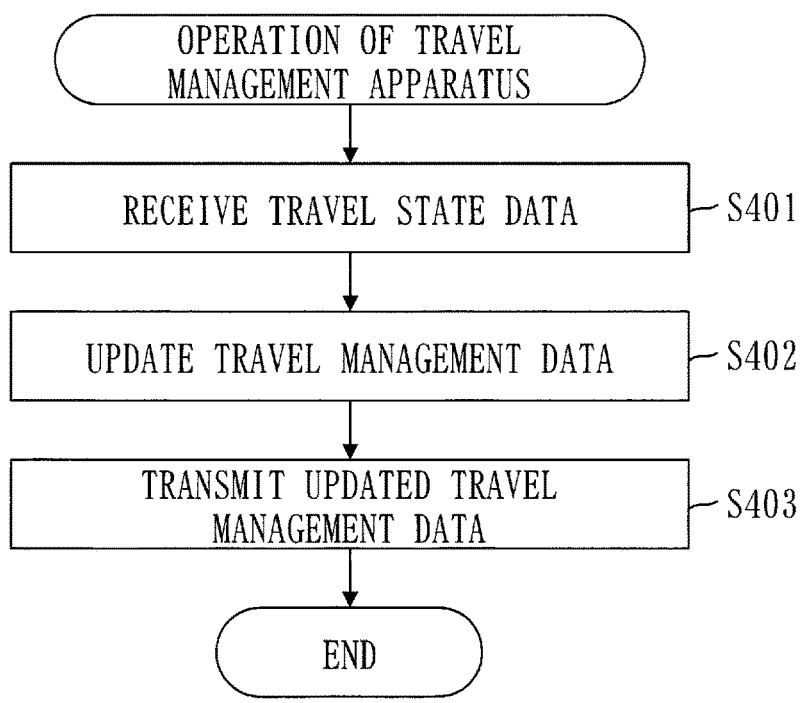
FIG. 13 is a flowchart illustrating an operation of the travel management apparatus 400 according to the first embodiment.

An operation of the travel management apparatus 400 will be described with reference to FIG. 13.

In step S401, the travel state reception unit 411 receives the travel state data transmitted from the vehicle monitoring apparatus 300.

In step S402, the travel management unit 412 updates travel management data 491 on the basis of the travel state data.

The travel management data 491 is data for managing the travel schedule of the vehicle 110 and the travel state of the vehicle 110.

The travel management data 491 will be described with reference to FIG. 14.

The travel management data 491 is stored in the storage device of the travel management apparatus 400 separately for each vehicle 110. For example, the travel management data 491 for each vehicle 110 is stored in a database structured by the storage device of the travel management apparatus 400.

The travel management data 491 in FIG. 14 is the travel management data 491 for a vehicle (R0001). The vehicle (R0001) is the vehicle 110 identified by a vehicle identifier "R0001".

The travel management data 491 is data in a table format, and includes a record for each stop station. The stop station is a station where the vehicle 110 stops.

Each record includes the vehicle identifier, a train composition identifier, a station name, a scheduled time, and a delay time.

The vehicle identifier is an identifier for identifying the vehicle 110.

The train composition identifier is an identifier for identifying a train composition.

The station name is a name of a stop station.

The scheduled time is a time when the vehicle 110 is scheduled to arrive at a station.

The delay time is a time of delay from the scheduled time upon arrival of the vehicle 110 at the station.

Referring back to FIG. 13, step S402 will be further described.

Specifically, the travel management unit 412 updates the travel management data 491 in the following manner.

First, the travel management unit 412 acquires a vehicle identifier from the travel state data, and selects the travel management data 491 corresponding to the acquired vehicle identifier.

Next, the travel management unit 412 acquires the station name of the arrival station from the travel state data.

Next, the travel management unit 412 selects, in the selected travel management data 491, a record including a vehicle identifier and a station name matching the acquired vehicle identifier and the acquired station name, respectively.

Next, the travel management unit 412 acquires the scheduled time from the selected record.

Next, the travel management unit 412 acquires the arrival time from the travel state data, and calculates a time from the scheduled time to the arrival time. The calculated time is the delay time.

Then, the travel management unit 412 sets the delay time in the selected record. For example, the travel management unit 412 sets the delay time in the selected record by issuing an UPDATE command to the database where the selected travel management data 491 is stored.

In step S403, the travel management data transmission unit 413 transmits the updated travel management data 491 to the data processing apparatus 500.

The updated travel management data 491 is the travel management data 491 updated in step S402.

Figure 15:
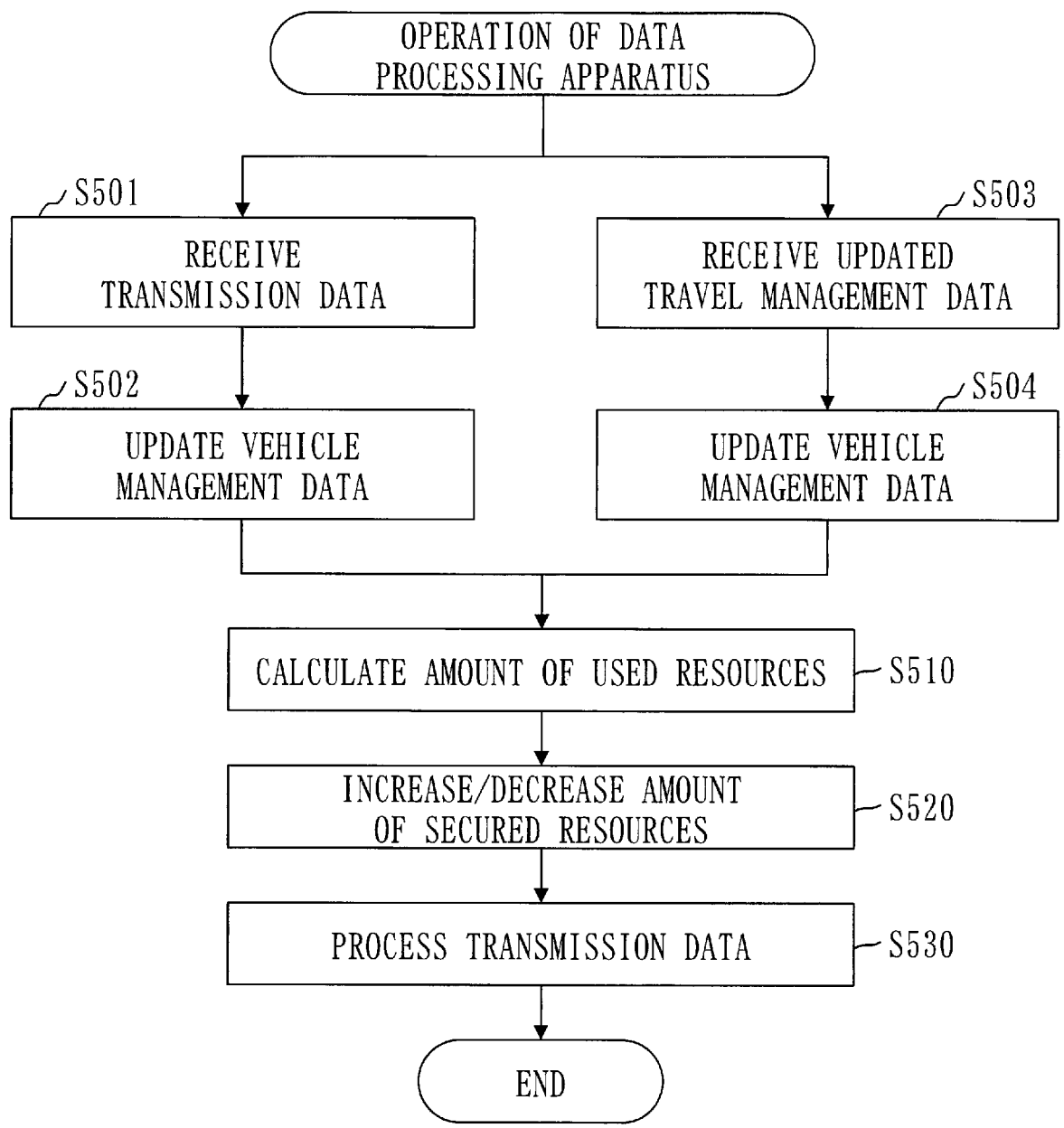
FIG. 15 is a flowchart illustrating an operation of the data processing apparatus 500 according to the first embodiment.

An operation of the data processing apparatus 500 will be described with reference to FIG. 15.

In step S501, the transmission data reception unit 511 receives the transmission data 391 and the load monitoring data 392 transmitted from the vehicle monitoring apparatus 300.

In step S502, the vehicle management unit 522 updates vehicle management data 591 on the basis of the load monitoring data 392.

The vehicle management data 591 is data for managing each vehicle 110.

The vehicle management data 591 will be described with reference to FIG. 16.

The vehicle management data 591 is data in a table format, and includes a record for each vehicle 110.

Each record includes the vehicle identifier, the train composition identifier, the amount of transmission data, a start time, and an end time.

The start time is a time when traveling of the vehicle 110 is started.

The end time is a time when traveling of the vehicle 110 is ended.

Referring back to FIG. 15, step S502 will be further described.

Specifically, the vehicle management unit 522 updates the vehicle management data 591 in the following manner.

First, the vehicle management unit 522 acquires the vehicle identifier and the amount of transmission data from the load monitoring data 392.

Next, the vehicle management unit 522 selects, in the vehicle management data 591, a record including a vehicle identifier matching the acquired vehicle identifier.

Then, the vehicle management unit 522 updates the amount of transmission data set in the selected record to the amount of transmission data acquired from the load monitoring data 392.

In step S503, the travel management data reception unit 521 receives the updated travel management data 491 transmitted from the travel management apparatus 400.

In step S504, the vehicle management unit 522 updates the vehicle management data 591 on the basis of the updated travel management data 491.

Specifically, the vehicle management unit 522 updates the vehicle management data 591 in the following manner. Here, the updated travel management data 491 that is currently received will be referred to as current travel management data 491, and the update travel management data 491 that is previously received will be referred to as previous travel management data 491.

First, the vehicle management unit 522 acquires the vehicle identifier from the current travel management data 491.

Next, the vehicle management unit 522 selects, in the vehicle management data 591, a record including a vehicle identifier matching the acquired vehicle identifier.

Next, the vehicle management unit 522 acquires the delay time from each of the current travel management data 491 and the previous travel management data 491. The delay time acquired from the current travel management data 491 will be referred to as a current delay time, and the delay time acquired from the previous travel management data 491 will be referred to as a previous delay time.

Next, the vehicle management unit 522 subtracts the previous delay time from the current delay time. A time that is calculated in this manner will be referred to as an adjustment time.

Then, the vehicle management unit 522 adds the adjustment time to the end time that is set in the selected record.

In step S510, the resource amount calculation unit 512 calculates the amount of used resources on the basis of the amount of transmission data.

The amount of used resources is the amount of resources, in the amount of resources of computer resources, used in processing the transmission data 391. That is, the amount of used resources is the amount of resources necessary to process the transmission data 391. The amount of used resources also indicates performance necessary to process the transmission data 391.

Specifically, the computer resources are resources of the data processing apparatus 500. For example, the computer resources are the processor 501, the memory 502, the auxiliary storage device 503, or a virtual machine.

Specifically, the resource amount calculation unit 512 calculates the amount of used resources in the following manner.

First, the resource amount calculation unit 512 acquires the amount of transmission data from the record that is updated in step S502, among the records included in the vehicle management data 591.

Then, the resource amount calculation unit 512 divides the amount of transmission data by a reference amount of data. The value that is calculated in this manner is the amount of used resources. The reference amount of data is determined in advance.

For example, in the case where the amount of transmission data is 6 megabytes per minute, and the reference amount of data is 1 megabyte per minute, the amount of used resources is 6 instances. An instance is a unit indicating the amount of resources.

Figures 16, 17:
FIG. 16 is a diagram illustrating vehicle management data 591 according to the first embodiment.
FIG. 17 is a diagram illustrating a specific example of an amount of used resources according to the first embodiment.

FIG. 17 illustrates a specific example of the amount of used resources. The reference data is 1 megabyte per minute.

In the case where the amount of transmission data is 6 megabytes per minute, the amount of used resources is 6 instances.

In the case where the amount of transmission data is 16 megabytes per minute, the amount of used resources is 16 instances.

In the case where the amount of transmission data is 11 megabytes per minute, the amount of used resources is 11 instances.

In the case where the amount of transmission data is 1 megabyte per minute, the amount of used resources is 1 instance.

In step S520, the resource amount adjustment unit 513 increases or decreases the amount of secured resources to the amount of used resources.

The amount of secured resources is the amount of resources that is secured in the amount of resources of the computer resources.

Specifically, the resource amount adjustment unit 513 operates in the following manner.

In the case where the amount of secured resources is greater than the amount of used resources, and processing of the previous transmission data 391 is already completed, the resource amount adjustment unit 513 decreases the amount of secured resources to the amount of used resources.

In the case where the amount of secured resources is smaller than the amount of used resources, the resource amount adjustment unit 513 increases the amount of secured resources to the amount of used resources.

Figure 18:
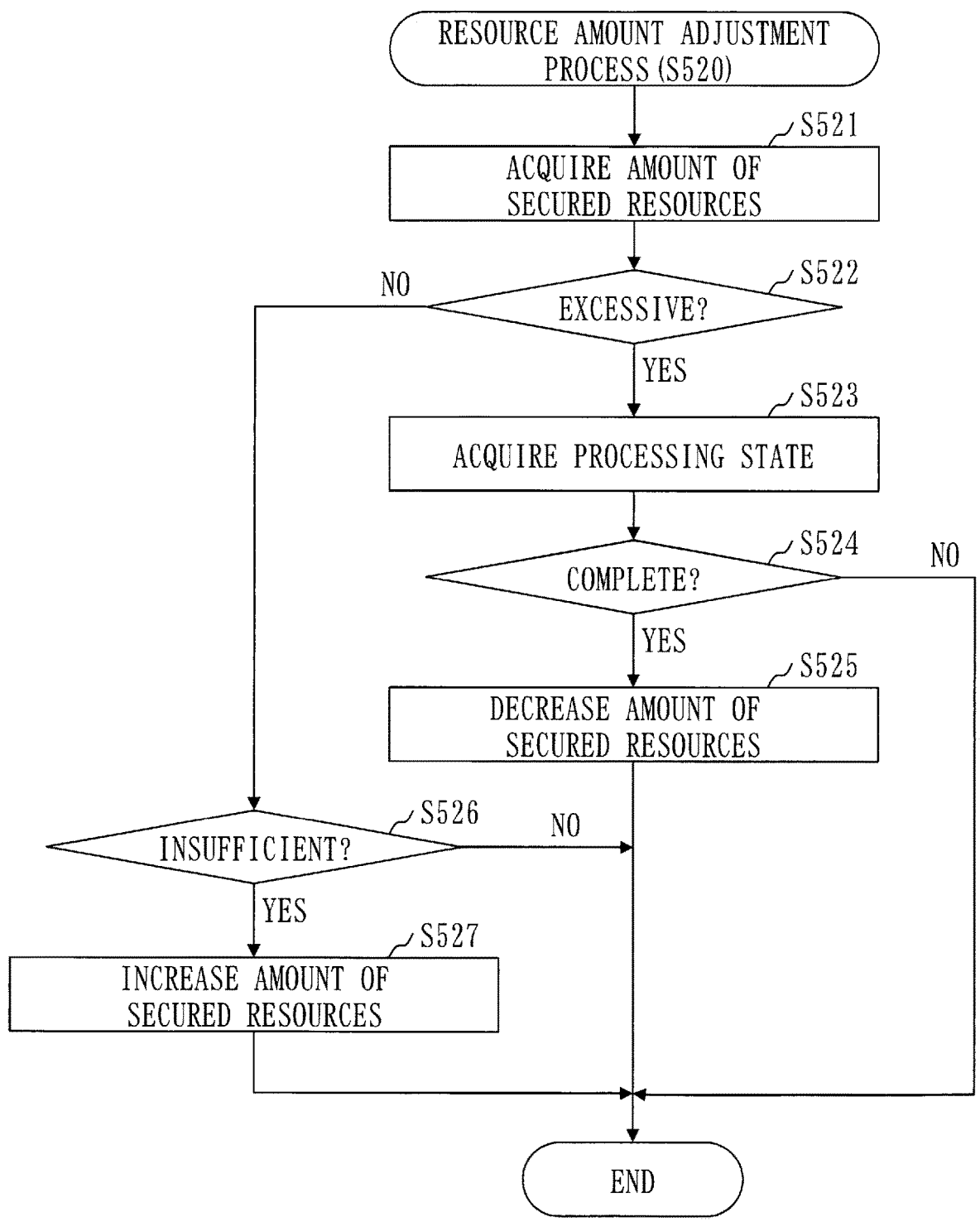
FIG. 18 is a flowchart of a resource amount adjustment process (S520) according to the first embodiment.

A resource amount adjustment process (S520) will be described with reference to FIG. 18.

The resource amount adjustment process (S520) is performed on a regular basis. For example, the resource amount adjustment process (S520) is performed at a 10-minute interval.

In step S521, the resource amount adjustment unit 513 acquires the vehicle identifier from the record that is updated in step S502, among the records included in the vehicle management data 591.

Then, the resource amount adjustment unit 513 acquires the amount of secured resources corresponding to the vehicle identifier. The amount of secured resources corresponding to the vehicle identifier is the amount of resources secured for the transmission data 391 of the vehicle 110 identified by the vehicle identifier.

Specifically, the resource amount adjustment unit 513 inquires the OS of the amount of secured resources by issuing a command to the OS.

The resource amount adjustment unit 513 may alternatively inquire a process, corresponding to the vehicle identifier, of the amount of secured resources by issuing a command to the process. The process corresponding to the vehicle identifier is a process for processing the transmission data 391 of the vehicle 110 identified by the vehicle identifier.

In step S522, the resource amount adjustment unit 513 determines whether the amount of secured resources is excessive.

Specifically, the resource amount adjustment unit 513 compares the amount of secured resources acquired in step S521 with the amount of used resources calculated in step S510. In the case where the amount of secured resources is greater than the amount of used resources, the amount of secured resources is excessive.

In the case where the amount of secured resources is excessive, the process proceeds to step S523.

In the case where the amount of secured resources is not excessive, the process proceeds to step S526.

In step S523, the resource amount adjustment unit 513 acquires a processing state corresponding to the vehicle identifier acquired in step S521. The processing state corresponding to the vehicle identifier is a state of processing corresponding to the vehicle identifier. Processing corresponding to the vehicle identifier is processing on the transmission data 391 of the vehicle 110 that is identified by the vehicle identifier.

Specifically, the resource amount adjustment unit 513 inquires the OS of the processing state by issuing a command to the OS.

The resource amount adjustment unit 513 may alternatively inquire a process, corresponding to the vehicle identifier, of the processing state by issuing a command to the process.

The processing state indicates complete or incomplete.

Complete indicated by the processing state means that the processing is complete.

Incomplete indicated by the processing state means that the processing is not complete.

In step S524, the resource amount adjustment unit 513 determines whether the processing state indicates complete.

In the case where the processing state indicates complete, the process proceeds to step S525.

In the case where the processing state indicates incomplete, the process is ended.

In step S525, the resource amount adjustment unit 513 decreases the amount of secured resources corresponding to the vehicle identifier acquired in step S521 to the amount of used resources.

Specifically, the resource amount adjustment unit 513 decreases the amount of secured resources by issuing a command to the OS. The resource amount adjustment unit 513 may alternatively decrease the amount of secured resources by issuing a command to the process corresponding to the vehicle identifier.

The process is ended after step S525.

In step S526, the resource amount adjustment unit 513 determines whether the amount of secured resources is insufficient.

Specifically, the resource amount adjustment unit 513 compares the amount of secured resources acquired in step S521 with the amount of used resources calculated in step S510. In the case where the amount of secured resources is smaller than the amount of used resources, the amount of secured resources is insufficient.

In the case where the amount of secured resources is insufficient, the process proceeds to step S527.

In the case where the amount of secured resources is not insufficient, or in other words, in the case where the amount of secured resources matches the amount of used resources, the process is ended.

In step S527, the resource amount adjustment unit 513 increases the amount of secured resources corresponding to the vehicle identifier acquired in step S521 to the amount of used resources.

Specifically, the resource amount adjustment unit 513 increases the amount of secured resources by issuing a command to the OS. The resource amount adjustment unit 513 may alternatively increase the amount of secured resources by issuing a command to the process corresponding to the vehicle identifier.

The process is ended after step S527.

Referring back to FIG. 15, step S530 will be described.

In step S530, the data processing unit 514 processes the transmission data 391 by using the amount of secured resources in the amount of resources of the computer resources.

Specifically, the data processing unit 514 performs specific data processing on the transmission data 391 received in step S501. In the specific data processing, the data processing unit 514 uses the amount of secured resources secured in step S520.

Advantageous Effects of First Embodiment

According to the first embodiment, data processing may be performed by securing just the necessary amount of resources. Accordingly, an excessive amount of resources may be prevented from being secured.

Second Embodiment

A mode of transmission of the transmission data 391 to the travel management apparatus 400 from a first vehicle and through a second vehicle will be described with reference to FIGS. 19 to 25, focusing mainly on differences to the first embodiment.

*Description of Configuration*

Figure 19:
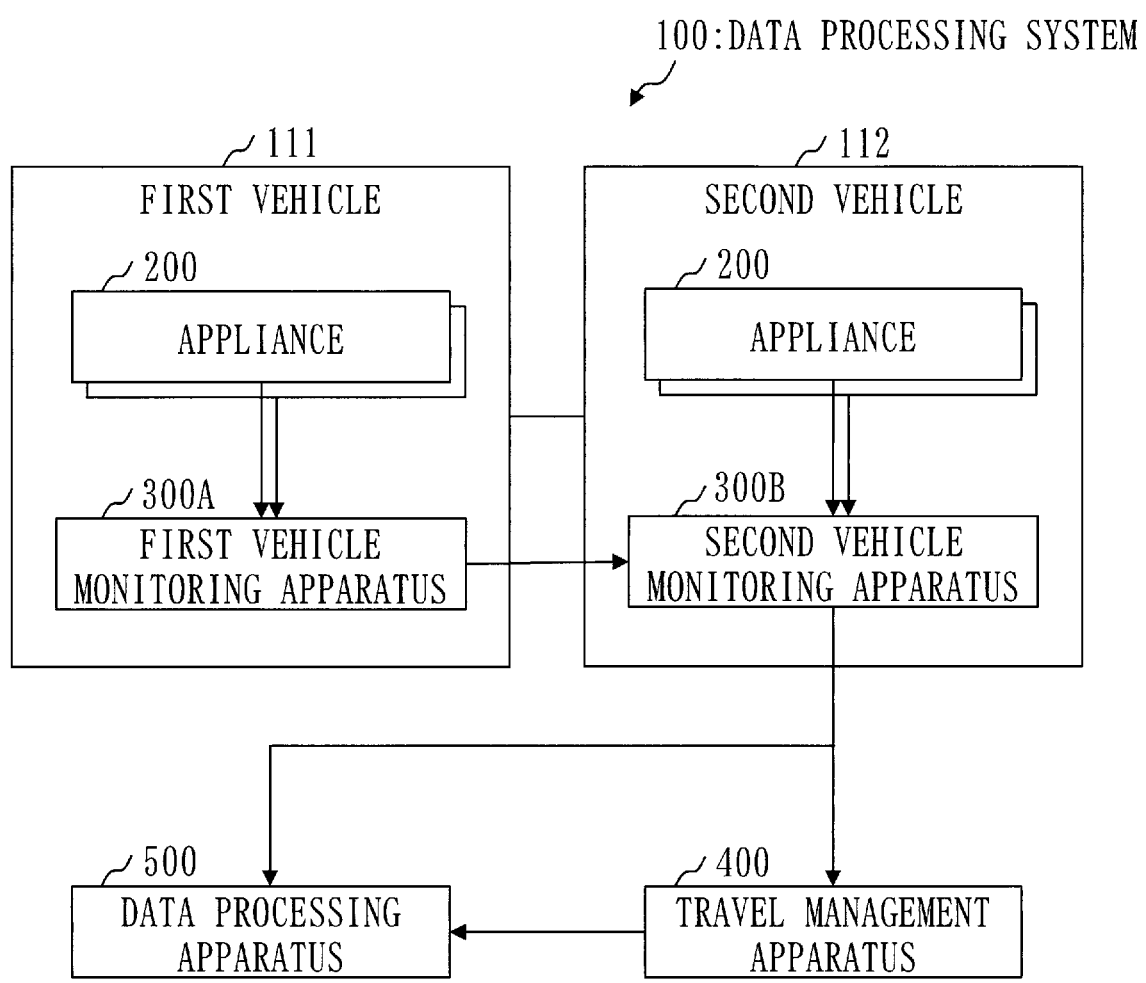
FIG. 19 is a configuration diagram of the data processing system 100 according to a second embodiment.

A configuration of the data processing system 100 will be described with reference to FIG. 19.

The data processing system 100 includes two vehicles (111, 112) that are connected to each other.

The first vehicle 111 and the second vehicle 112 each correspond to the vehicle 110 according to the first embodiment.

The first vehicle 111 includes a first vehicle monitoring apparatus 300A, and the second vehicle 112 includes a second vehicle monitoring apparatus 300B.

The first vehicle monitoring apparatus 300A and the second vehicle monitoring apparatus 300B each correspond to the vehicle monitoring apparatus 300 according to the first embodiment.

Figure 20:
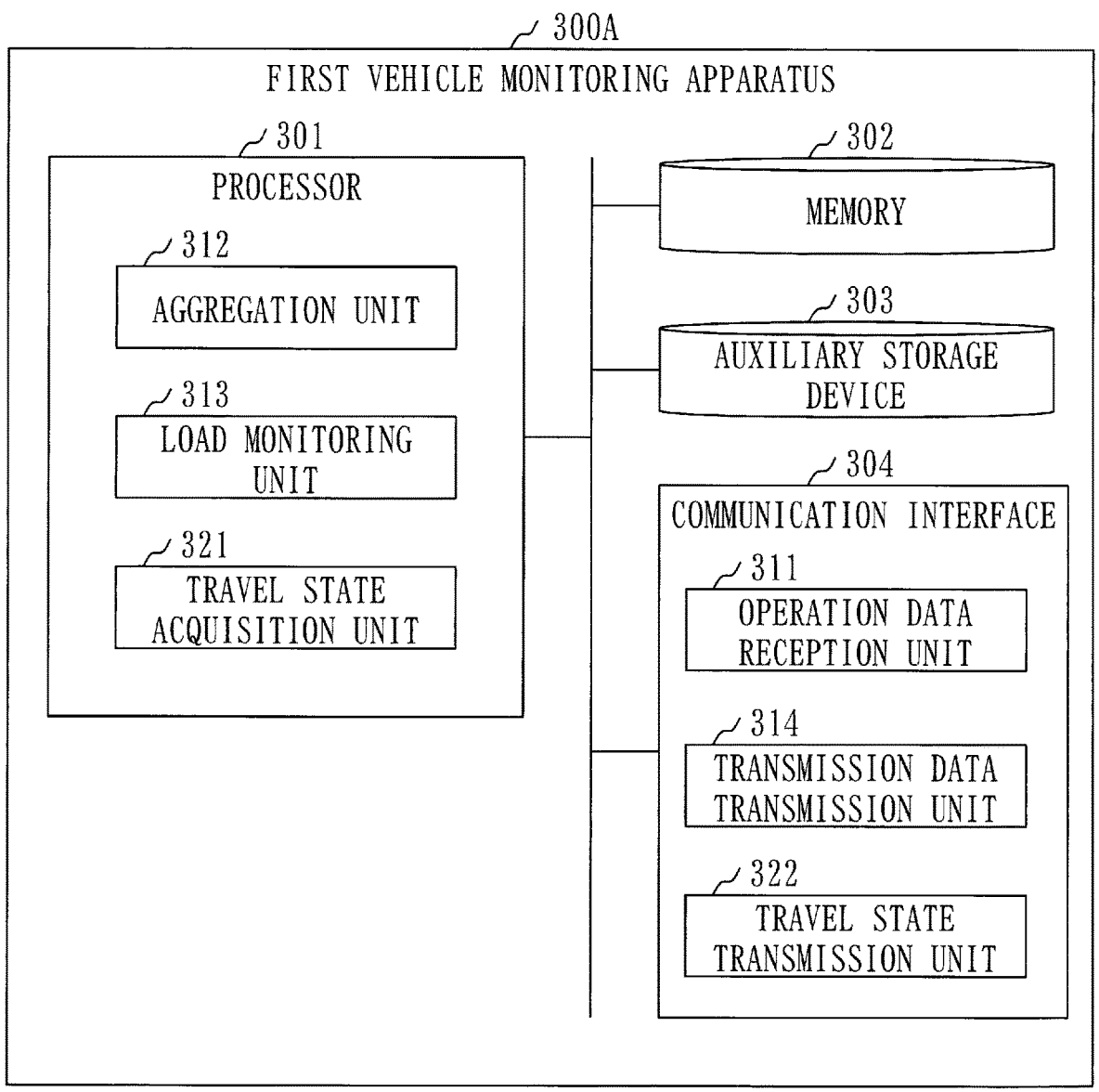
FIG. 20 is a configuration diagram of a first vehicle monitoring apparatus 300A according to the second embodiment.

A configuration of the first vehicle monitoring apparatus 300A will be described with reference to FIG. 20.

The configuration of the first vehicle monitoring apparatus 300A is the same as the configuration of the vehicle monitoring apparatus 300 according to the first embodiment.

Figure 21:
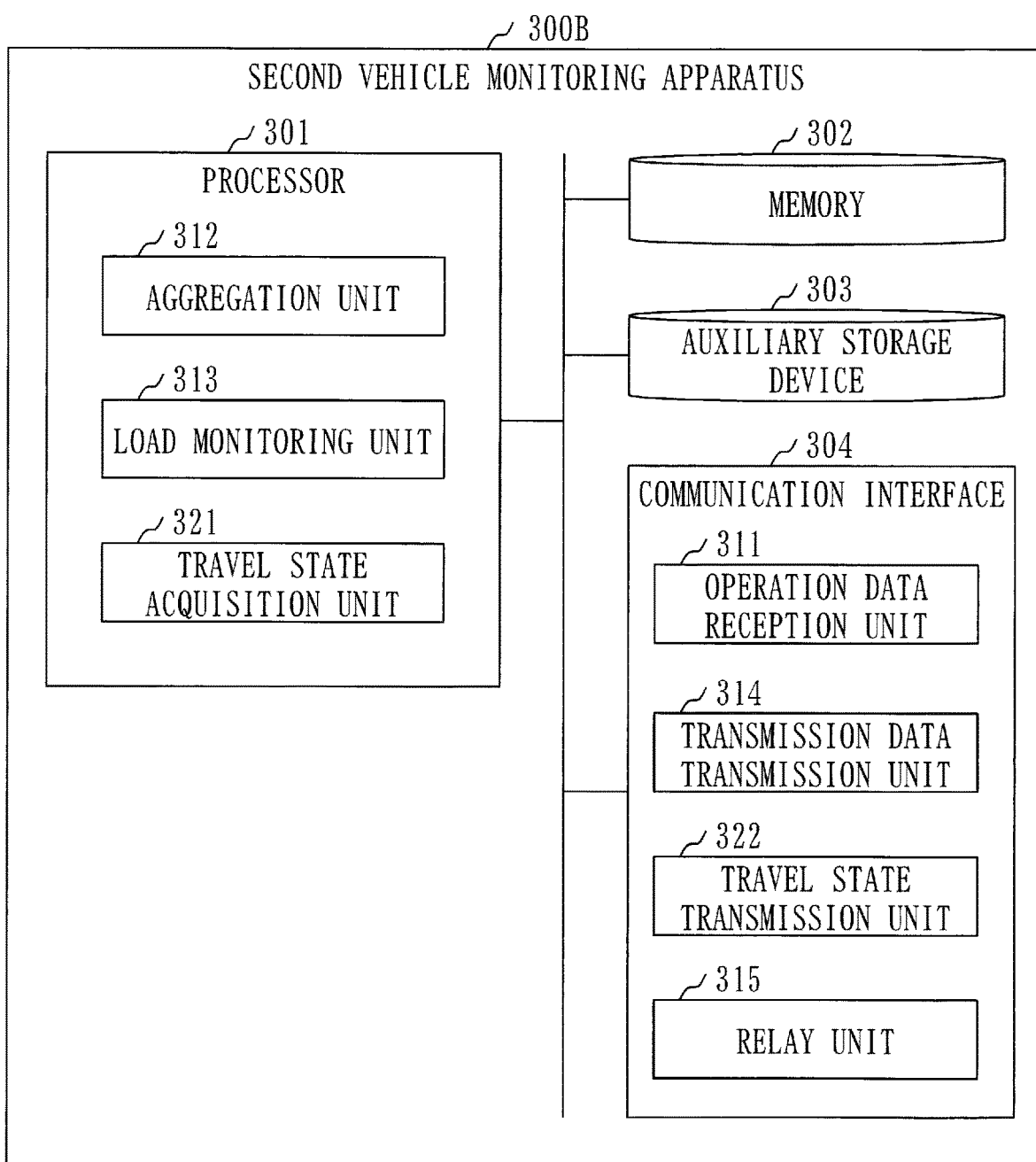
FIG. 21 is a configuration diagram of a second vehicle monitoring apparatus 300B according to the second embodiment.

A configuration of the second vehicle monitoring apparatus 300B will be described with reference to FIG. 21.

The second vehicle monitoring apparatus 300B includes a relay unit 315, in addition to the structural elements of the vehicle monitoring apparatus 300 according to the first embodiment.

*Description of Operation*

A data processing method is basically the same as the method according to the first embodiment.

However, communication paths of the transmission data 391, the load monitoring data 392, and the travel state data are different from the communication paths according to the first embodiment.

Specifically, the first vehicle monitoring apparatus 300A transmits the transmission data 391 and the load monitoring data 392 to the data processing apparatus through the second vehicle monitoring apparatus 300B. Furthermore, the first vehicle monitoring apparatus 300A transmits the travel state data to the travel management apparatus 400 through the second vehicle monitoring apparatus 300B.

Figure 22:
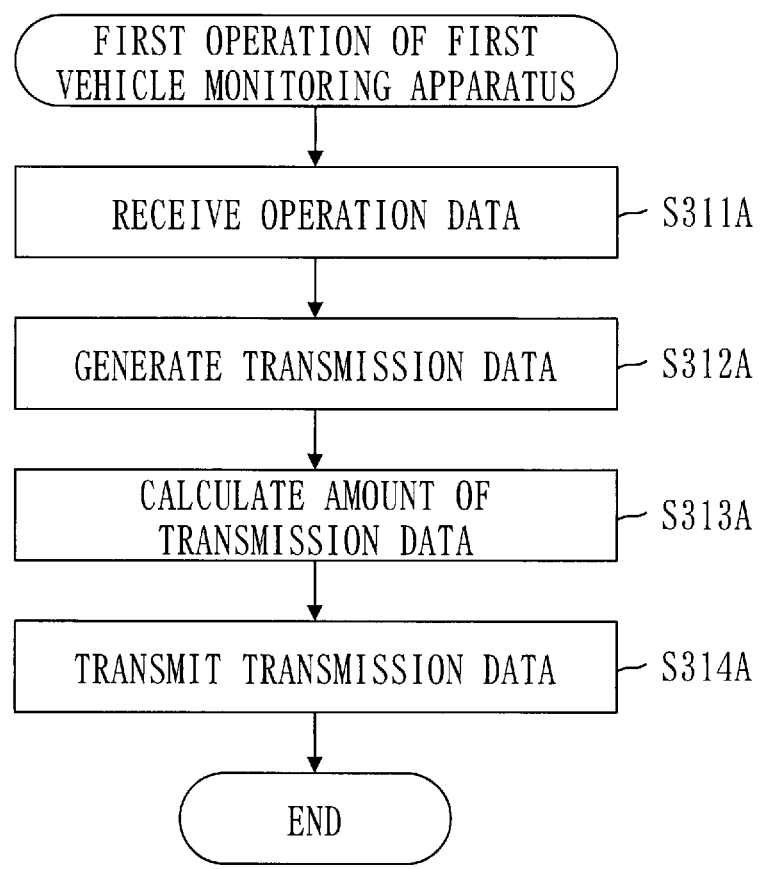
FIG. 22 is a flowchart illustrating a first operation of the first vehicle monitoring apparatus 300A according to the second embodiment.

A first operation of the first vehicle monitoring apparatus 300A will be described with reference to FIG. 22.

Figure 9:
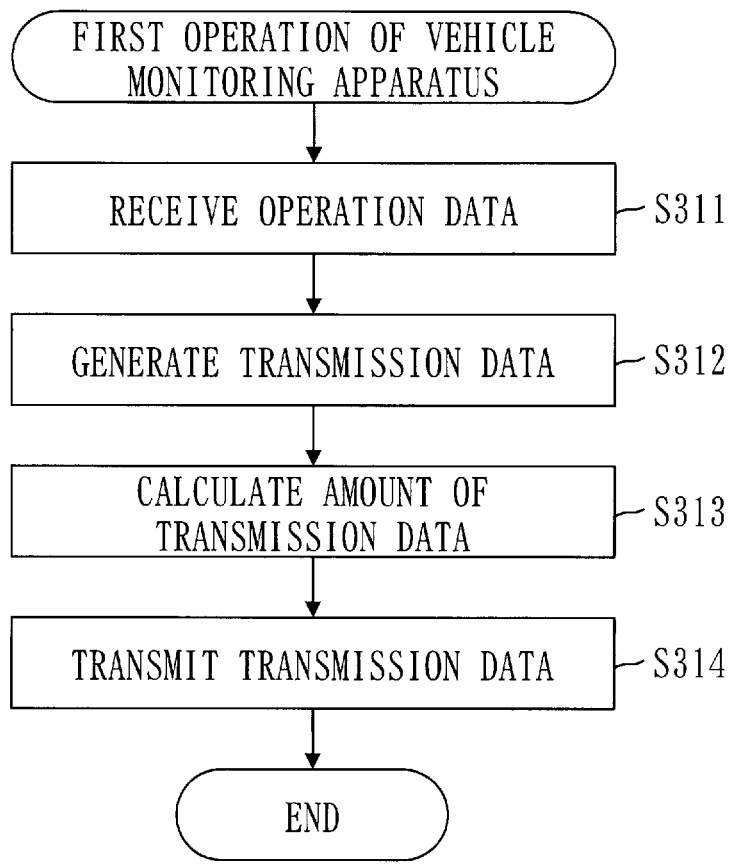
FIG. 9 is a flowchart illustrating a first operation of the vehicle monitoring apparatus 300 according to the first embodiment.

Processes from step S311A to step S313A are the same as the processes from step S311 to step S313 according to the first embodiment (see FIG. 9).

In step S314A, the transmission data transmission unit 314 of the first vehicle monitoring apparatus 300A transmits the transmission data 391 of the first vehicle 111 and the load monitoring data 392 of the first vehicle 111 to the second vehicle monitoring apparatus 300B.

Figure 23:
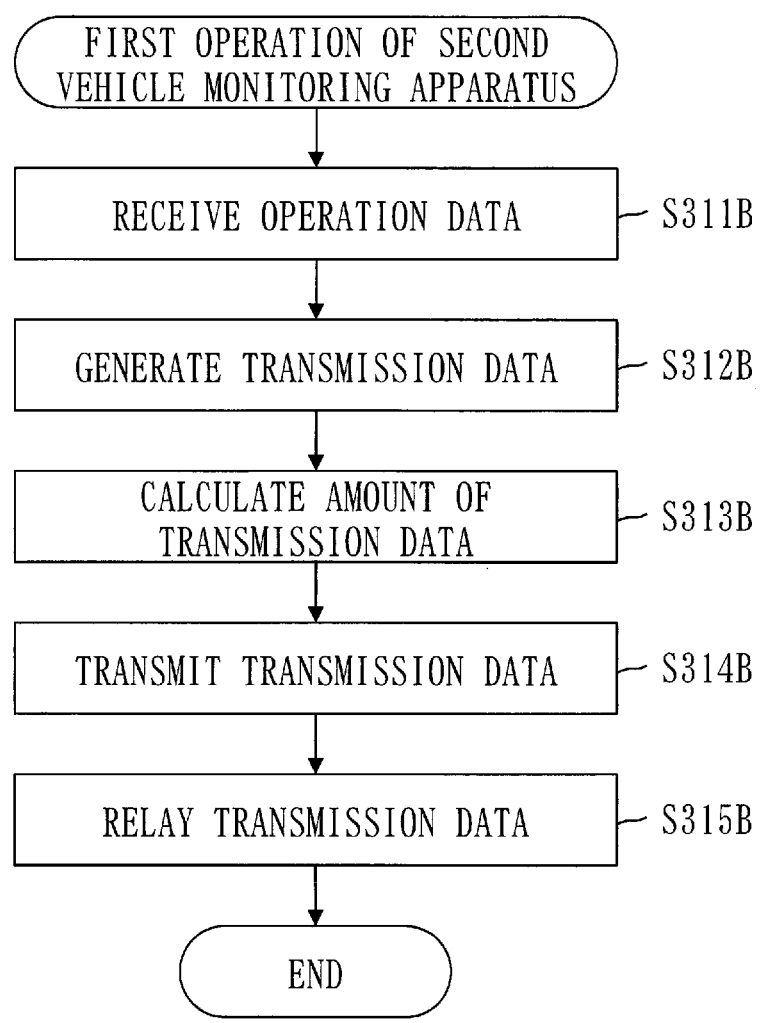
FIG. 23 is a flowchart illustrating a first operation of the second vehicle monitoring apparatus 300B according to the second embodiment.

A first operation of the second vehicle monitoring apparatus 300B will be described with reference to FIG. 23.

Processes from step S311B to step S314B are the same as the processes from step S311 to step S314 according to the first embodiment (see FIG. 9).

That is, the transmission data transmission unit 314 of the second vehicle monitoring apparatus 300B transmits the transmission data 391 of the second vehicle 112 and the load monitoring data 392 of the second vehicle 112 to the data processing apparatus 500.

In step S315B, the relay unit 315 of the second vehicle monitoring apparatus 300B relays the transmission data 391 of the first vehicle 111 and the load monitoring data 392 of the first vehicle 111 to the data processing apparatus 500.

That is, in the case where the transmission data 391 of the first vehicle 111 and the load monitoring data 392 of the first vehicle 111 are transmitted from the first vehicle monitoring apparatus 300A, the relay unit 315 receives the transmission data 391 of the first vehicle 111 and the load monitoring data 392 of the first vehicle 111. Then, the relay unit 315 transmits the transmission data 391 of the first vehicle 111 and the load monitoring data 392 of the first vehicle 111 to the data processing apparatus 500.

Figure 24:
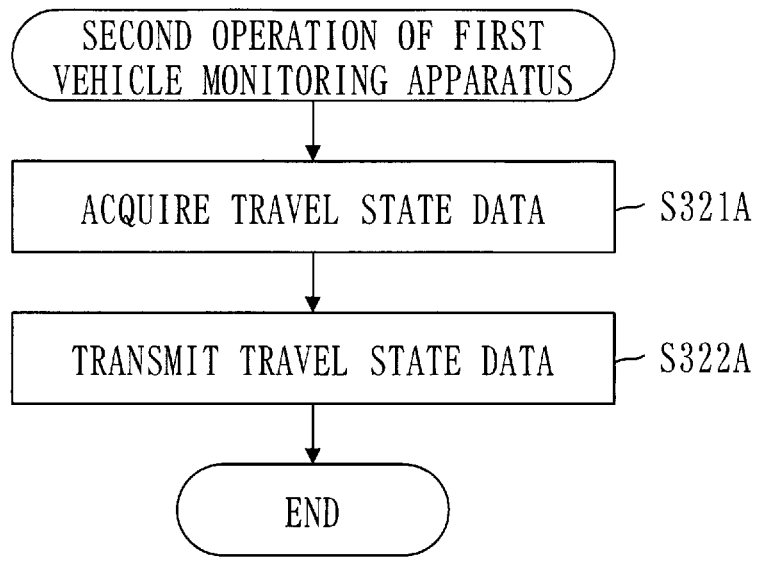
FIG. 24 is a flowchart illustrating a second operation of the first vehicle monitoring apparatus 300A according to the second embodiment.

A second operation of the first vehicle monitoring apparatus 300A will be described with reference to FIG. 24.

Figure 12:
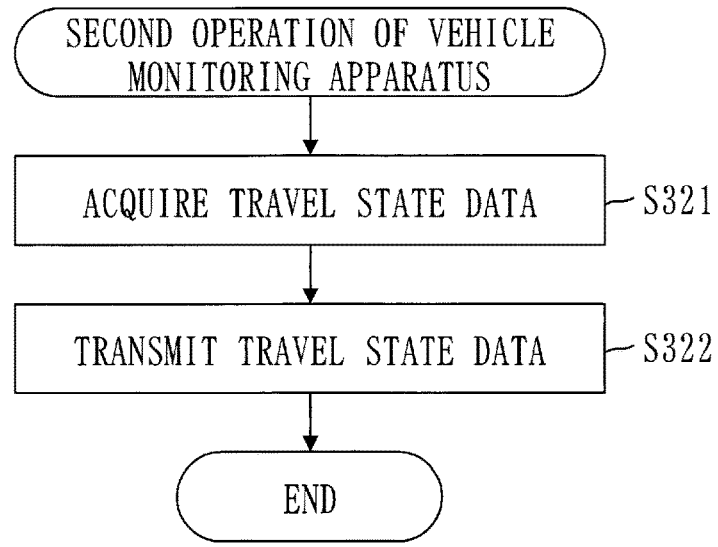
FIG. 12 is a flowchart illustrating a second operation of the vehicle monitoring apparatus 300 according to the first embodiment.

Step S321A is the same as step S321 according to the first embodiment (see FIG. 12).

In step S322A, the travel state transmission unit 322 of the first vehicle monitoring apparatus 300A transmits the travel state data of the first vehicle 111 to the second vehicle monitoring apparatus 300B.

Figure 25:
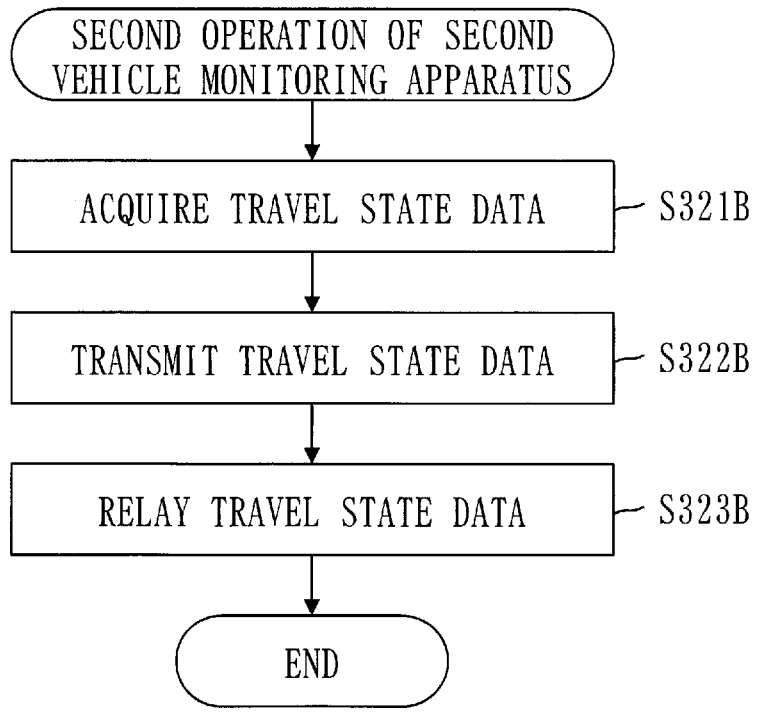
FIG. 25 is a flowchart illustrating a second operation of the second vehicle monitoring apparatus 300B according to the second embodiment.

A second operation of the second vehicle monitoring apparatus 300B will be described with reference to FIG. 25.

Step S321B and step S322B are the same as step S321 and step S322 according to the first embodiment (see FIG. 12).

That is, the travel state transmission unit 322 of the second vehicle monitoring apparatus 300B transmits the travel state data of the second vehicle 112 to the data processing apparatus 500.

In step S323B, the relay unit 315 of the second vehicle monitoring apparatus 300B relays the travel state data of the first vehicle 111 to the data processing apparatus 500.

That is, in the case where the travel state data of the first vehicle 111 is transmitted from the first vehicle monitoring apparatus 300A, the relay unit 315 receives the travel state data of the first vehicle 111. Then, the relay unit 315 transmits the travel state data of the first vehicle 111 to the data processing apparatus 500.

Advantageous Effects of Second Embodiment

Even in a case where a plurality of vehicles are coupled and operated, the travel management apparatus 400 receives the travel state data from one vehicle, and the data processing apparatus 500 receives the transmission data 391 and the load monitoring data 392 from one vehicle. This may reduce overhead in communication.

*Supplementary Description of Embodiments*

Figure 26:
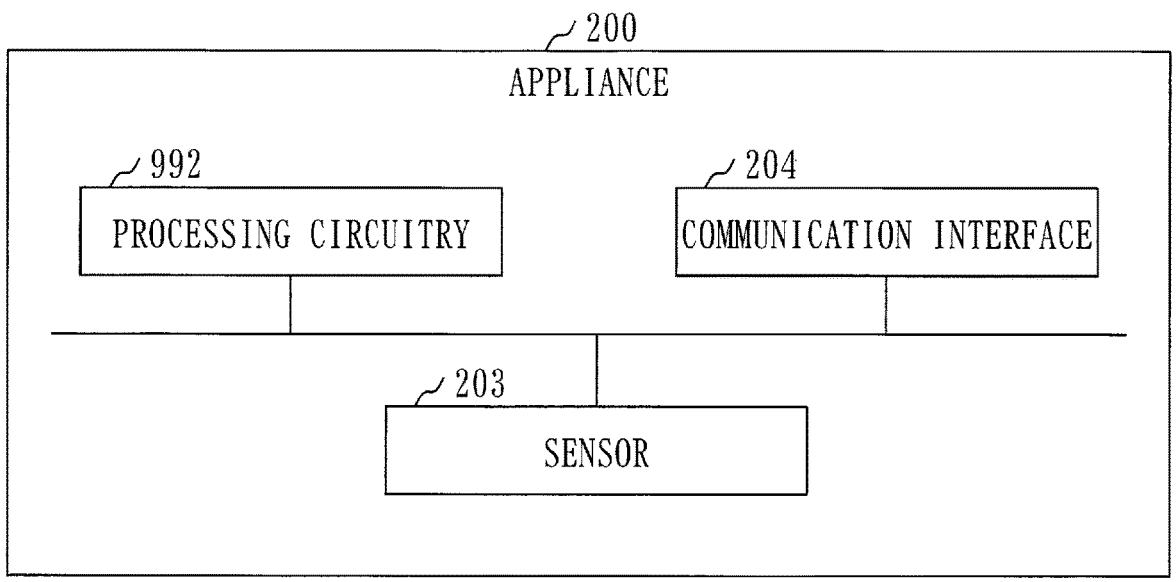
FIG. 26 is a hardware configuration diagram of the appliance 200 according to the embodiments.

A hardware configuration of the appliance 200 will be described with reference to FIG. 26.

The appliance 200 includes a processing circuitry 992.

The processing circuitry 992 is hardware that implements the diagnosis unit 212 and the operation data amount determination unit 213.

The processing circuitry 992 may be dedicated hardware, or may be the processor 201 that executes programs stored in the memory 202.

For example, in the case where the processing circuitry 992 is dedicated hardware, the processing circuitry 992 is a single circuit, multiple circuits, a programmed processor, multiple programmed processors, an ASIC, an FPGA, or a combination thereof.

ASIC is an abbreviation for Application Specific Integrated Circuit, and FPGA is an abbreviation for Field Programmable Gate Array.

The appliance 200 may include a plurality of processing circuits instead of the processing circuitry 992. The plurality of processing circuits share a role of the processing circuitry 992.

Functions of the appliance 200 may be implemented partly by dedicated hardware, and others by software or firmware.

As described above, the processing circuitry 992 may be implemented by hardware, software, firmware, or a combination thereof.

Figure 27:
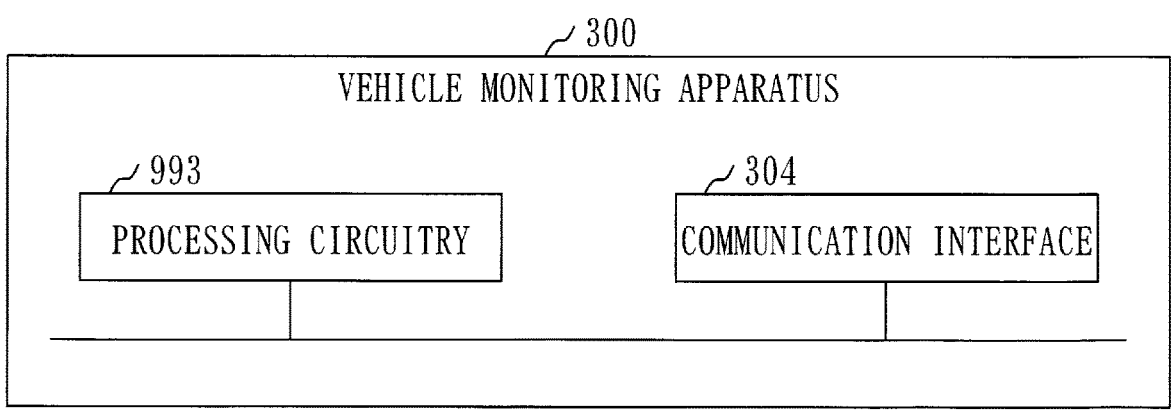
FIG. 27 is a hardware configuration diagram of the vehicle monitoring apparatus 300 according to the embodiments.

A hardware configuration of the vehicle monitoring apparatus 300 will be described with reference to FIG. 27.

The vehicle monitoring apparatus 300 includes a processing circuitry 993.

The processing circuitry 993 is hardware that implements the aggregation unit 312, the load monitoring unit 313, and the travel state acquisition unit 321.

The processing circuitry 993 may be dedicated hardware, or may be the processor 301 that executes programs stored in the memory 302.

For example, in the case where the processing circuitry 993 is dedicated hardware, the processing circuitry 993 is a single circuit, multiple circuits, a programmed processor, multiple programmed processors, an ASIC, an FPGA, or a combination thereof.

The vehicle monitoring apparatus 300 may include a plurality of processing circuits instead of the processing circuitry 993. The plurality of processing circuits share a role of the processing circuitry 993.

Functions of the vehicle monitoring apparatus 300 may be implemented partly by dedicated hardware, and others by software or firmware.

As described above, the processing circuitry 993 may be implemented by hardware, software, firmware, or a combination thereof.

Figure 28:
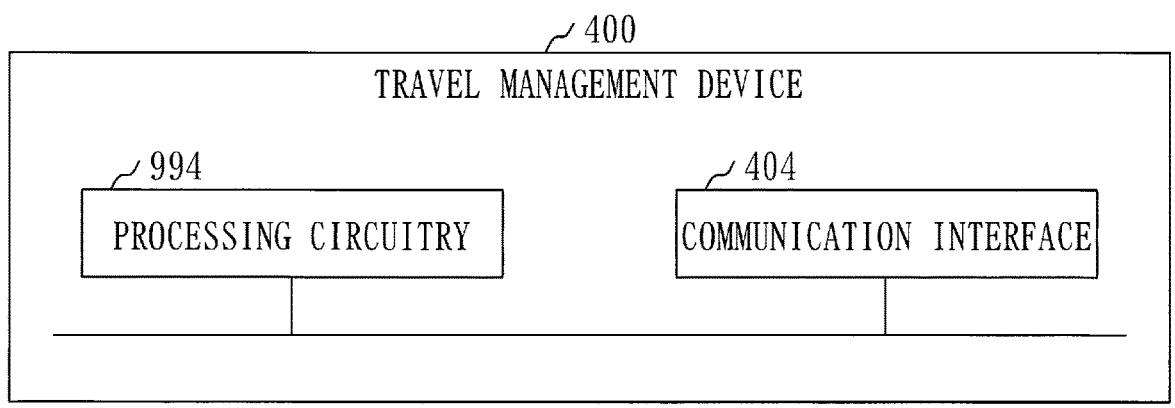
FIG. 28 is a hardware configuration diagram of the travel management apparatus 400 according to the embodiments.

A hardware configuration of the travel management apparatus 400 will be described with reference to FIG. 28.

The travel management apparatus 400 includes a processing circuitry 994.

The processing circuitry 994 is hardware that implements the travel management unit 412.

The processing circuitry 994 may be dedicated hardware, or may be the processor 401 that executes programs stored in the memory 402.

For example, in the case where the processing circuitry 994 is dedicated hardware, the processing circuitry 994 is a single circuit, multiple circuits, a programmed processor, multiple programmed processors, an ASIC, an FPGA, or a combination thereof.

The travel management apparatus 400 may include a plurality of processing circuits instead of the processing circuitry 994. The plurality of processing circuits share a role of the processing circuitry 994.

Functions of the travel management apparatus 400 may be implemented partly by dedicated hardware, and others by software or firmware.

As described above, the processing circuitry 994 may be implemented by hardware, software, firmware, or a combination thereof.

Figure 29:
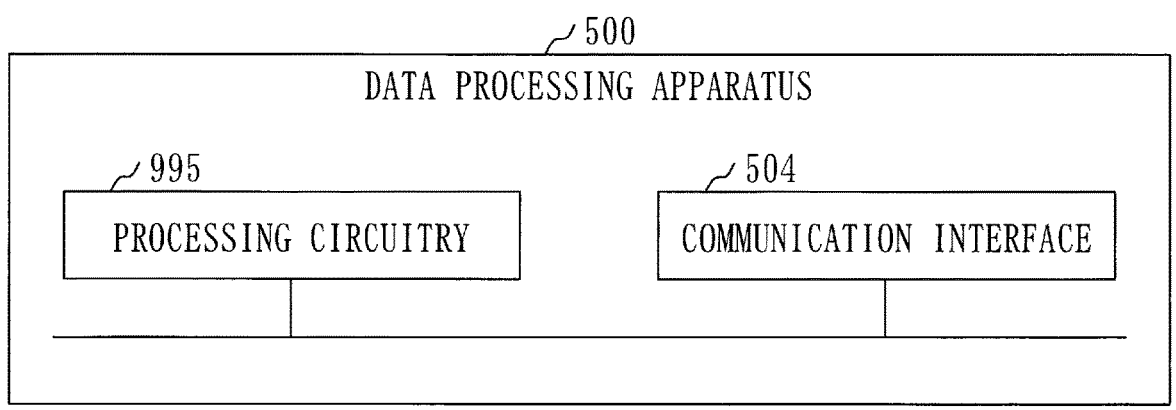
FIG. 29 is a hardware configuration diagram of the data processing apparatus 500 according to the embodiments.

A hardware configuration of the data processing apparatus 500 will be described with reference to FIG. 29.

The data processing apparatus 500 includes a processing circuitry 995.

The processing circuitry 995 is hardware that implements the resource amount calculation unit 512, the resource amount adjustment unit 513, the data processing unit 514, and the vehicle management unit 522.

The processing circuitry 995 may be dedicated hardware, or may be the processor 501 that executes programs stored in the memory 502.

For example, in the case where the processing circuitry 995 is dedicated hardware, the processing circuitry 995 is a single circuit, multiple circuits, a programmed processor, multiple programmed processors, an ASIC, an FPGA, or a combination thereof.

The data processing apparatus 500 may include a plurality of processing circuits instead of the processing circuitry 995. The plurality of processing circuits share a role of the processing circuitry 995.

Functions of the data processing apparatus 500 may be implemented partly by dedicated hardware, and others by software or firmware.

As described above, the processing circuitry 995 may be implemented by hardware, software, firmware, or a combination thereof.

Embodiments are illustration of preferred modes, and are not intended to limit the technical scope of the present invention. An embodiment may be partially carried out, or may be carried out in combination with another embodiment. Procedures described with reference to the flowcharts and the like may be changed as appropriate.

REFERENCE SIGNS LIST

100: data processing system, 110: vehicle, 111: first vehicle, 112: second vehicle, 200: appliance, 201: processor, 202: memory, 203: sensor, 204: communication interface, 211: measurement data acquisition unit, 212: diagnosis unit, 213: operation data amount determination unit, 214: operation data transmission unit, 291: measurement data, 292: diagnosis data, 300: vehicle monitoring apparatus, 300A: first vehicle monitoring apparatus, 300B: second vehicle monitoring apparatus, 301: processor, 302: memory, 303: auxiliary storage device, 304: communication interface, 311: operation data reception unit, 312: aggregation unit, 313: load monitoring unit, 314: transmission data transmission unit, 315: relay unit, 321: travel state acquisition unit, 322: travel state transmission unit, 391: transmission data, 392: load monitoring data, 400: travel management apparatus, 401: processor, 402: memory, 403: auxiliary storage device, 404: communication interface, 411: travel state reception unit, 412: travel management unit, 413: travel management data transmission unit, 491: travel management data, 500: data processing apparatus, 501: processor, 502: memory, 503: auxiliary storage device, 504: communication interface, 511: transmission data reception unit, 512: resource amount calculation unit, 513: resource amount adjustment unit, 514: data processing unit, 521: travel management data reception unit, 522: vehicle management unit, 591: vehicle management data, 992: processing circuitry, 993: processing circuitry, 994: processing circuitry, 995: processing circuitry.

The invention claimed is:

1. A data processing system comprising:
a vehicle monitoring apparatus; and
a data processing apparatus,
the data processing apparatus including:
  a communication interface to receive transmission data and an amount of transmission data; and
  processing circuitry
  to calculate, on a basis of the amount of transmission data, an amount of used resources that is an amount of resources that is used in processing the transmission data, in an amount of resources of computer resources,
  to increase or decrease, to the amount of used resources, an amount of secured resources that is an amount of resources that is secured in the amount of resources of the computer resources, and
  to process the transmission data by using the amount of secured resources in the amount of resources of the computer resources,
the vehicle monitoring apparatus including:
  a communication interface to receive operation data and an amount of operation data from each of one or more appliances; and processing circuitry
- to generate the transmission data by aggregating the operation data of the appliances, and
- to calculate the amount of transmission data by totaling the amounts of operation data of the appliances, the communication interface of the vehicle monitoring apparatus transmitting the transmission data and the amount of transmission data.

2. The data processing system according to claim 1, wherein, in a case where the amount of secured resources is greater than the amount of used resources, and processing on previous transmission data is already complete, the processing circuitry of the data processing apparatus decreases the amount of secured resources to the amount of used resources.

3. The data processing system according to claim 1, wherein, in a case where the amount of secured resources is smaller than the amount of used resources, the processing circuitry of the data processing apparatus increases the amount of secured resources to the amount of used resources.

4. The data processing system according to claim 1, comprising the one or more appliances, wherein
each appliance includes:
- a sensor to acquire measurement data every unit time;
- processing circuitry
  - to diagnose an appliance state on a basis of the measurement data and
  - to determine the amount of operation data on a basis of the appliance state; and
- a communication interface to transmit, as the operation data, measurement data, in the measurement data acquired, of an amount of data corresponding to the amount of operation data, and to transmit the amount of operation data.

5. The data processing system according to claim 1, comprising:
- a travel management apparatus including processing circuitry and a communication interface,
- wherein the processing circuitry of the vehicle monitoring apparatus acquires travel state data indicating an operation state of a vehicle where the one or more appliances are mounted,
- wherein the communication interface of the vehicle monitoring apparatus transmits the travel state data,
- wherein the communication interface of the travel management apparatus receives the travel state data, and
- wherein the processing circuitry of the travel management apparatus updates travel management data on a basis of the travel state data.

6. The data processing system according to claim 5,
- wherein the communication interface of the travel management apparatus transmits updated travel management data,
- wherein the communication interface of the data processing apparatus receives the updated travel management data, and
- wherein the processing circuitry of the data processing apparatus updates vehicle management data on a basis of the updated travel management data.

7. A data processing apparatus comprising:
a communication interface to receive transmission data obtained by aggregating operation data of appliances, and an amount of transmission data obtained by totaling amounts of operation data of appliances; and
processing circuitry
- to calculate, on a basis of the amount of transmission data, an amount of used resources that is an amount of resources that is used in processing the transmission data, in an amount of resources of computer resources,
- to increase or decrease, to the amount of used resources, an amount of secured resources that is an amount of resources that is secured in the amount of resources of the computer resources, and
- to process the transmission data by using the amount of secured resources in the amount of resources of the computer resources, the communication interface receiving operation data and an amount of operation data from each of one or more appliances,
the processing circuitry
generating the transmission data by aggregating the operation data of the appliances, and
calculating the amount of transmission data by totaling the amounts of operation data of the appliances,
the communication interface transmitting the transmission data and the amount of transmission data.

8. A non-transitory computer readable medium storing a data processing program for causing a computer to perform:
- a transmission data reception process for receiving transmission data obtained by aggregating operation data of appliances, and an amount of transmission data obtained by totaling amounts of operation data of appliances;
- a resource amount calculation process for calculating, on a basis of the amount of transmission data, an amount of used resources that is an amount of resources that is used in processing the transmission data, in an amount of resources of computer resources;
- a resource amount adjustment process for increasing or decreasing, to the amount of used resources, an amount of secured resources that is an amount of resources that is secured in the amount of resources of the computer resources;
- a data process for processing the transmission data by using the amount of secured resources in the amount of resources of the computer resources;
- an operation data reception process for receiving operation data and an amount of operation data from each of one or more appliances;
- an aggregation process for generating the transmission data by aggregating the operation data of the appliances;
- a load monitoring process for calculating the amount of transmission data by totaling the amounts of operation data of the appliances; and
- a transmission data transmission process for transmitting the transmission data and the amount of transmission data.

* * * * *